United States Patent
Ripa et al.

(10) Patent No.: US 9,521,258 B2
(45) Date of Patent: Dec. 13, 2016

(54) REAL-TIME CALL CENTER CALL MONITORING AND ANALYSIS

(71) Applicant: Castel Communications, LLC, Buffalo, NY (US)

(72) Inventors: John Ripa, Getzville, NY (US); Rachid Cheaib, Williamsville, NY (US)

(73) Assignee: Castel Communications, LLC, Buffalo, NY (US)

( * ) Notice: Subject to any disclaimer, the term of this patent is extended or adjusted under 35 U.S.C. 154(b) by 4 days.

(21) Appl. No.: 13/910,531

(22) Filed: Jun. 5, 2013

(65) Prior Publication Data

US 2014/0140496 A1    May 22, 2014

Related U.S. Application Data

(60) Provisional application No. 61/728,933, filed on Nov. 21, 2012, provisional application No. 61/772,815, filed on Mar. 5, 2013.

(51) Int. Cl.
| | |
|---|---|
| *H04M 3/00* | (2006.01) |
| *H04M 5/00* | (2006.01) |
| *H04M 3/51* | (2006.01) |
| *G10L 25/48* | (2013.01) |
| *H04M 3/523* | (2006.01) |
| *G10L 25/63* | (2013.01) |

(52) U.S. Cl.
CPC ............ *H04M 3/5175* (2013.01); *G10L 25/48* (2013.01); *H04M 3/5133* (2013.01); *G10L 25/63* (2013.01); *H04M 3/51* (2013.01); *H04M 3/523* (2013.01); *H04M 2201/12* (2013.01); *H04M 2201/38* (2013.01); *H04M 2201/40* (2013.01); *H04M 2203/401* (2013.01)

(58) Field of Classification Search
CPC ............ H04M 3/5175; H04M 3/42221; H04M 2201/40
USPC ............. 379/265.02, 265.06, 265.07, 265.12
See application file for complete search history.

(56) References Cited

U.S. PATENT DOCUMENTS

| | | | |
|---|---|---|---|
| 6,724,887 B1 | 4/2004 | Eilbacher et al. | |
| 6,959,080 B2 | 10/2005 | Dezonno et al. | |
| 7,085,719 B1* | 8/2006 | Shambaugh et al. | .... 379/265.06 |
| 8,396,205 B1 | 3/2013 | Lowry et al. | |
| 2002/0194002 A1* | 12/2002 | Petrushin | ...................... 704/270 |
| 2006/0159241 A1 | 7/2006 | Jagdish et al. | |

(Continued)

*Primary Examiner* — Nafiz E Hoque
(74) *Attorney, Agent, or Firm* — Hodgson Russ LLP

(57) ABSTRACT

Systems and methods are provided for analyzing conversations between customers and call center agents in real-time. An agent may be located at an agent station having a display screen. A continuous audio feed of the conversation between a customer and an agent may be received. For every second that the customer is speaking, a customer emotion score may be calculated in real-time. A frequency at which calculated customer emotion scores equal or exceed an emotion score threshold during a specified time interval may be calculated in real-time during the conversation. The calculated frequency for the customer may be compared, in real-time, to a plurality of specified frequency thresholds. A visual representation corresponding to a highest of the plurality of specified frequency thresholds that is equaled or exceeded by the calculated frequency for the customer may be displayed in real-time on the display screen of the agent station.

12 Claims, 18 Drawing Sheets

260↘

\<emotion_exp_properties_custom_v_smith\>

262↘\<window_size\> 10 \</window_size\>
264↘\<emotion_th_val\> 20 \</emotion_th_val\>
266↘\<yellow_freq_th\> 0.3 \</yellow_freq_th\>
268↘\<amber_freq_th\> 0.5 \</amber_freq_th\>
270↘\<red_freq_th\>    0.7 \</red_freq_th\>
272↘\<alert_freq_th\>  0.9 \</alert_freq_th\>

•
•
•

\</emotion_exp_properties_custom_v_smith\>

(56) References Cited

U.S. PATENT DOCUMENTS

| | | |
|---|---|---|
| 2006/0233347 A1* | 10/2006 | Tong et al. .............. 379/265.06 |
| 2006/0265090 A1 | 11/2006 | Conway et al. |
| 2007/0121824 A1 | 5/2007 | Agapi et al. |
| 2010/0332287 A1 | 12/2010 | Gates et al. |
| 2011/0010173 A1 | 1/2011 | Scott et al. |
| 2011/0033036 A1 | 2/2011 | Edwards et al. |
| 2011/0208522 A1 | 8/2011 | Pereg et al. |
| 2012/0224020 A1 | 9/2012 | Portman et al. |
| 2012/0296642 A1 | 11/2012 | Shammass et al. |
| 2013/0039483 A1* | 2/2013 | Wolfeld et al. .......... 379/265.03 |
| 2013/0246053 A1* | 9/2013 | Scott et al. ................... 704/201 |

\* cited by examiner

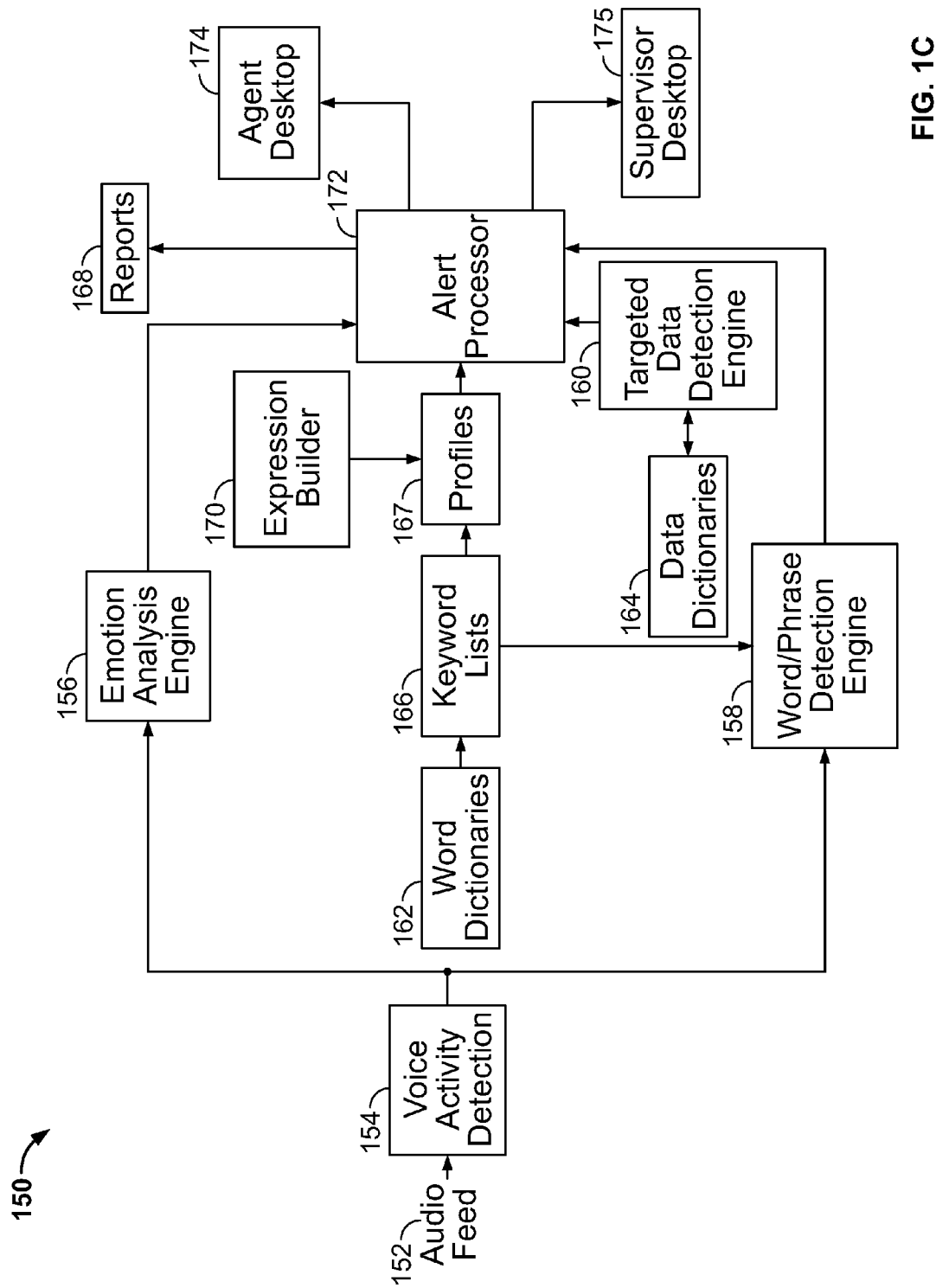

200 ↘

| 202 → Window Size | 5 |
|---|---|
| 204 → Emotion Score Threshold Value | 15 |
| 206 → Yellow Frequency Threshold | 20% |
| 208 → Amber Frequency Threshold | 40% |
| 210 → Red Frequency Threshold | 60% |
| 212 → Alert Frequency Threshold | 80% |

<emotion_exp_properties_default>
   232 → <window_size> 5 </window_size>
   234 → <emotion_th_val> 15 </emotion_th_val>
   236 → <yellow_freq_th> 0.2 </yellow_freq_th>
   238 → <amber_freq_th> 0.4 </amber_freq_th>
   240 → <red_freq_th>   0.6 </red_freq_th>
   242 → <alert_freq_th>  0.8 </alert_freq_th>
               •
               •
</emotion_exp_properties_default>

<emotion_exp_properties_custom_v_smith>
    262 — <window_size> 10 </window_size>
    264 — <emotion_th_val> 20 </emotion_th_val>
    266 — <yellow_freq_th> 0.3 </yellow_freq_th>
    268 — <amber_freq_th> 0.5 </amber_freq_th>
    270 — <red_freq_th> 0.7 </red_freq_th>
    272 — <alert_freq_th> 0.9 </alert_freq_th>
    ⋮
</emotion_exp_properties_custom_v_smith>

| 402 ⟶ | Word/Phrase | Hate |
|---|---|---|
| 404 ⟶ | Event Type | PEV |
| 406 ⟶ | Event Count | 1 |
| 408 ⟶ | Confidence Threshold | 70% |
| 410 ⟶ | Start Time | 0 |
| 412 ⟶ | Stop Time | 30 |
| 414 ⟶ | Score Type | POS |
| 416 ⟶ | Score Operator | MULT |
| 418 ⟶ | Score Factor | 5 |

| 432 ⟶ | Word/Phrase | This call is being recorded |
|---|---|---|
| 434 ⟶ | Event Type | NEV |
| 436 ⟶ | Event Count | 1 |
| 438 ⟶ | Confidence Threshold | 80% |
| 440 ⟶ | Start Time | 0 |
| 442 ⟶ | Stop Time | No limit |
| 444 ⟶ | Score Type | POS |
| 446 ⟶ | Score Operator | MULT |
| 448 ⟶ | Score Factor | 5 |

| 462 ⟶ | Targeted Data | StateRestrictions |
|---|---|---|
| 464 ⟶ | Data Dictionary Name | StatesDictionary |

```
<word-phrase_exp_properties_default1>
  <word-phrase> hate </word-phrase>
  <event_type> PEV </event_type>
  <event_count> 1 </event_count>
  <confidence_th> 0.7 </confidence_th>
  <start_time> 0 </start_time>
  <stop_time> 30 </stop_time>
  <score_type> POS </score_type>
  <score_operator> MULT </score_operator>
  <score_factor> 5 </score_factor>
</word-phrase_exp_properties_default1>
```

```
<word-phrase_exp_properties_default2>
  <word-phrase> This_call_is_being_recorded </word-phrase>
  <event_type> NEV </event_type>
  <event_count> 1 </event_count>
  <confidence_th> 0.8 </confidence_th>
  <start_time> 0 </start_time>
  <stop_time> no_limit </stop_time>
  <score_type> POS </score_type>
  <score_operator> MULT </score_operator>
  <score_factor> 5 </score_factor>
</word-phrase_exp_properties_default2>
```

```
<data_exp_properties_default>
  <targeted_data> StateRestrictions </targeted_data>
  <data_dictionary_name> StatesDictionary</data_dictionary_name>
</data_exp_properties_default>
```

FIG. 5C

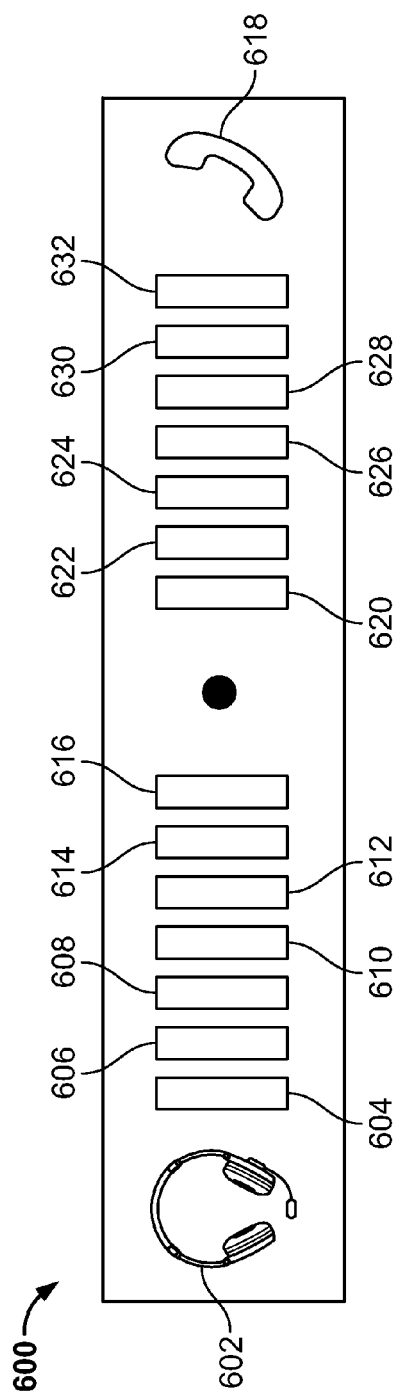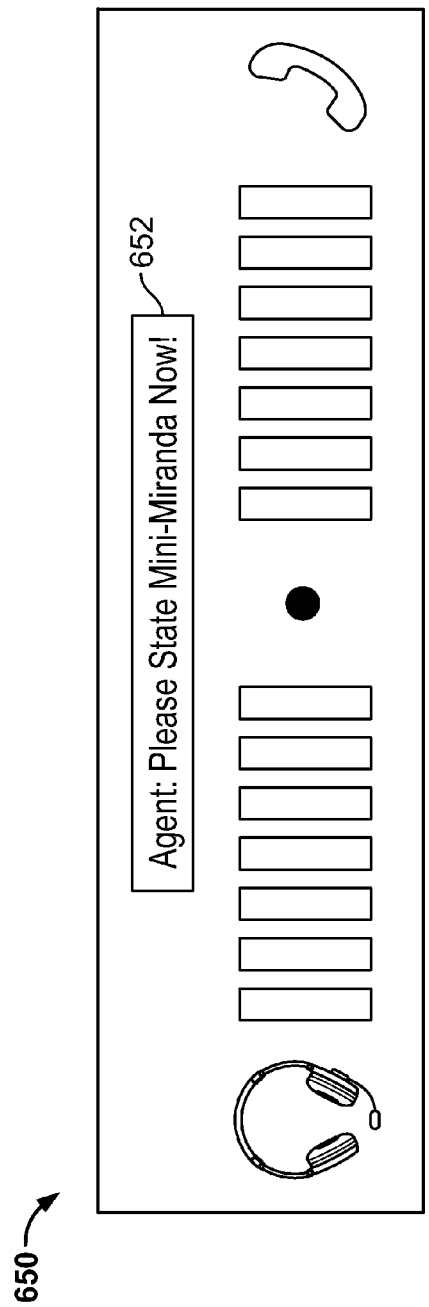
FIG. 6A
FIG. 6B

| Agent ID (902) | Last Name (904) | First Name (906) | Emotion Score Average | | | Average No. of Word/Phrase Events Per Call | | |
|---|---|---|---|---|---|---|---|---|
| | | | Overall (908) | Last 10 Days (910) | Last 30 Days (912) | Overall (914) | Last 10 Days (916) | Last 30 Days (918) |
| GE009 (920) | Swift | James | 5 | 5 | 5 | 2 | 3 | 2 |
| GE001 (922) | Smith | Veronica | 17 | 14 | 15 | 8 | 8 | 9 |
| GE000 (924) | Pacifico | Angelica | 8 | 9 | 8 | 3 | 3 | 3 |
| GE004 (926) | Thomas | Bobby | 4 | 3 | 3 | 1 | 1 | 1 |
| GE002 (928) | Brown | Johnathan | 12 | 12 | 13 | 5 | 4 | 4 |
| MEAN (930) | — | — | 10 | 9 | 10 | 4 | 6 | 5 |

FIG. 9

REAL-TIME CALL CENTER CALL MONITORING AND ANALYSIS

CROSS REFERENCE TO RELATED APPLICATIONS

This application claims the benefit of U.S. Provisional Application Ser. No. 61/728,933, filed Nov. 21, 2012, and U.S. Provisional Application Ser. No. 61/772,815, filed Mar. 5, 2013, the contents of which are incorporated by reference herein in their entireties.

BACKGROUND OF THE DISCLOSURE

Call centers have been used for decades to centralize the process of calling a number of related parties from a physical location or multiple physical locations where a number of telephone agents work, or to handle incoming calls where a large volume of calls is expected. Call centers may handle such services as help desk, customer support, lead generation, emergency response, telephone answering service, inbound response, and outbound telemarketing. In order to assist call center agents, a number of technologies have been developed to assist in the operation and management of these call centers. This includes automated dialers that place outgoing calls using records retrieved from a database, as well as software to distribute information about each called party or incoming calling party for display at work stations where agents are located.

The agents in call centers are trained to handle as many calls as possible while meeting corporate goals in areas such as service quality, customer understanding, and regulation compliance. Since a call center is often a large operation, often manned by a large management chain and sometimes operated by a subcontractor, monitoring and modifying the agents' behavior is a complex and sensitive task. However, operating a call center that treats customers respectfully and meets their needs is important because the call center is often perceived as a reflection of the capabilities of a corporation.

SUMMARY

The systems and methods described herein include monitoring and analyzing calls to and from a call center. A call center may handle thousands of calls between call center agents and customers. The calls may be monitored to measure the emotion levels of agents and customers. An emotion level meter may be displayed at an agent's station during a call to indicate the emotion level of the agent and the emotion level of the customer to whom the agent is speaking. For example, the meter may display green lights when a call begins, and red lights may be displayed if the system detects that the agent or customer is experiencing an emotion-based event (e.g., anger) monitored by the system. Various shades of color between green and red (e.g. yellow, amber) may be used to indicate various levels of emotion. If the emotions of either the agent or customer rise above a certain level, an emotion alert may be displayed to the agent and also to an agent supervisor. Calls between agents and customers may also be monitored to detect certain words or phrases spoken by either the agent or customer, as well as to detect specific data elements within the system or externally integrated with the system. Agents may be required by law or company policy to let a customer know that the call is being recorded, and an alert may be sent to an agent and a supervisor if such a "mini-Miranda" phrase is not detected within a certain period of time.

A supervisor may view the emotion analysis and word/phrase detection for multiple calls at the same time, and may listen in on or intervene in a call or provide coaching to an agent in real-time as necessary. Calls between agents and customers may be recorded, and parts of a conversation with high emotion levels, certain words, or certain data elements detected may be flagged for later review. Statistics may be calculated for a particular agent or group of agents based on the emotion analysis, word/phrase detection, and processing of data elements as internal or external systemic data. Reports may be generated from such statistics for training and evaluation purposes.

Generally, the systems and methods described herein include the user interfaces on the agent's station and the supervisor's station, and related hardware or software for performing emotional analysis, voice and word/phrase detection, expression building, alert generation, and report management. The systems and methods described herein may be customizable as desired for a particular application.

BRIEF DESCRIPTION OF THE DRAWINGS

The foregoing and other objects and advantages of the disclosure will be appreciated more fully from the following further description thereof, with reference to the accompanying drawings, wherein:

FIG. 1C depicts the interactions between various functional modules of the systems of FIGS. 1A-B according to an illustrative embodiment of the disclosure;

FIG. 2A is a table of exemplary expression properties and expression property values of an emotion base expression according to an illustrative embodiment of the disclosure;

FIG. 2B is a data structure for storing expression property values of an emotion base expression according to an illustrative embodiment of the disclosure;

FIG. 2C is another data structure for storing expression property values of an emotion base expression according to an illustrative embodiment of the disclosure;

FIG. 4A is a table of exemplary expression properties and expression property values of a word/phrase base expression according to an illustrative embodiment of the disclosure;

FIG. 4B is another table of exemplary expression properties and expression property values of a word/phrase base expression according to an illustrative embodiment of the disclosure;

FIG. 4C is a table of exemplary expression properties and expression property values of a data base expression according to an illustrative embodiment of the disclosure;

FIG. 5A is a data structure for storing expression property values of a word/phrase base expression according to an illustrative embodiment of the disclosure;

FIG. 5B is another data structure for storing expression property values of a word/phrase base expression according to an illustrative embodiment of the disclosure;

FIG. 5C is a data structure for storing expression property values of a data base expression according to an illustrative embodiment of the disclosure;

FIG. 6A depicts an emotion level meter for indicating emotion levels of a call center agent and a customer according to an illustrative embodiment of the disclosure;

FIG. 6B depicts an emotion level meter with an instruction for an agent according to an illustrative embodiment of the disclosure;

FIG. 9 shows a report that may be generated based on emotion and word/phrase information compiled over time for several agents according to an illustrative embodiment of the disclosure;

DETAILED DESCRIPTION

To provide an overall understanding of the disclosure, certain illustrative embodiments will now be described, including a system for call center emotion analysis and word/phrase detection, and components thereof. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 3:
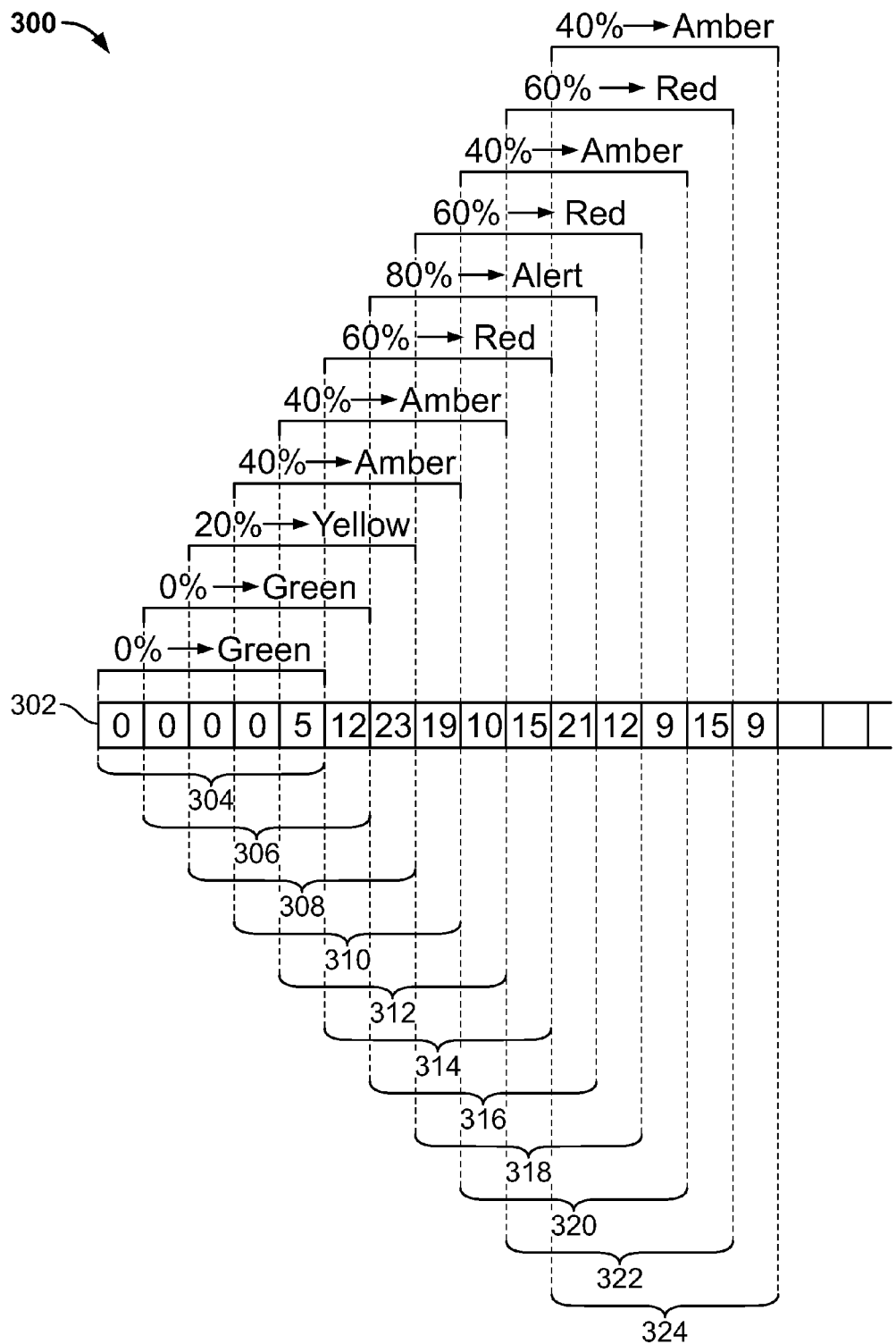
FIG. 3 is a diagram of how emotion light colors are set based on emotion scores according to an illustrative embodiment of the disclosure.
Figure 7:
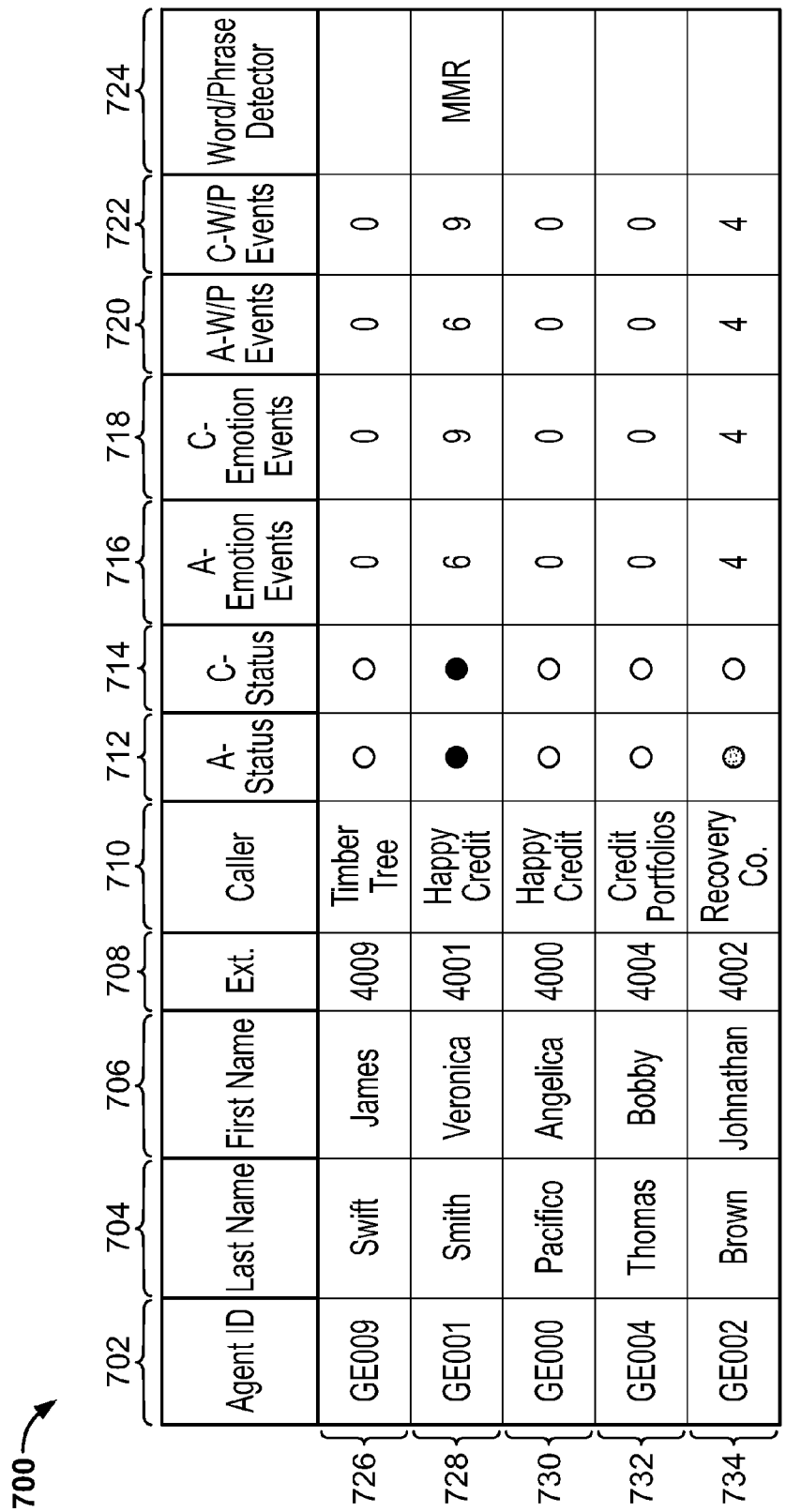
FIG. 7 shows a real-time report with emotion and word/phrase information for the calls of several call center agents according to an illustrative embodiment of the disclosure.
Figure 8:
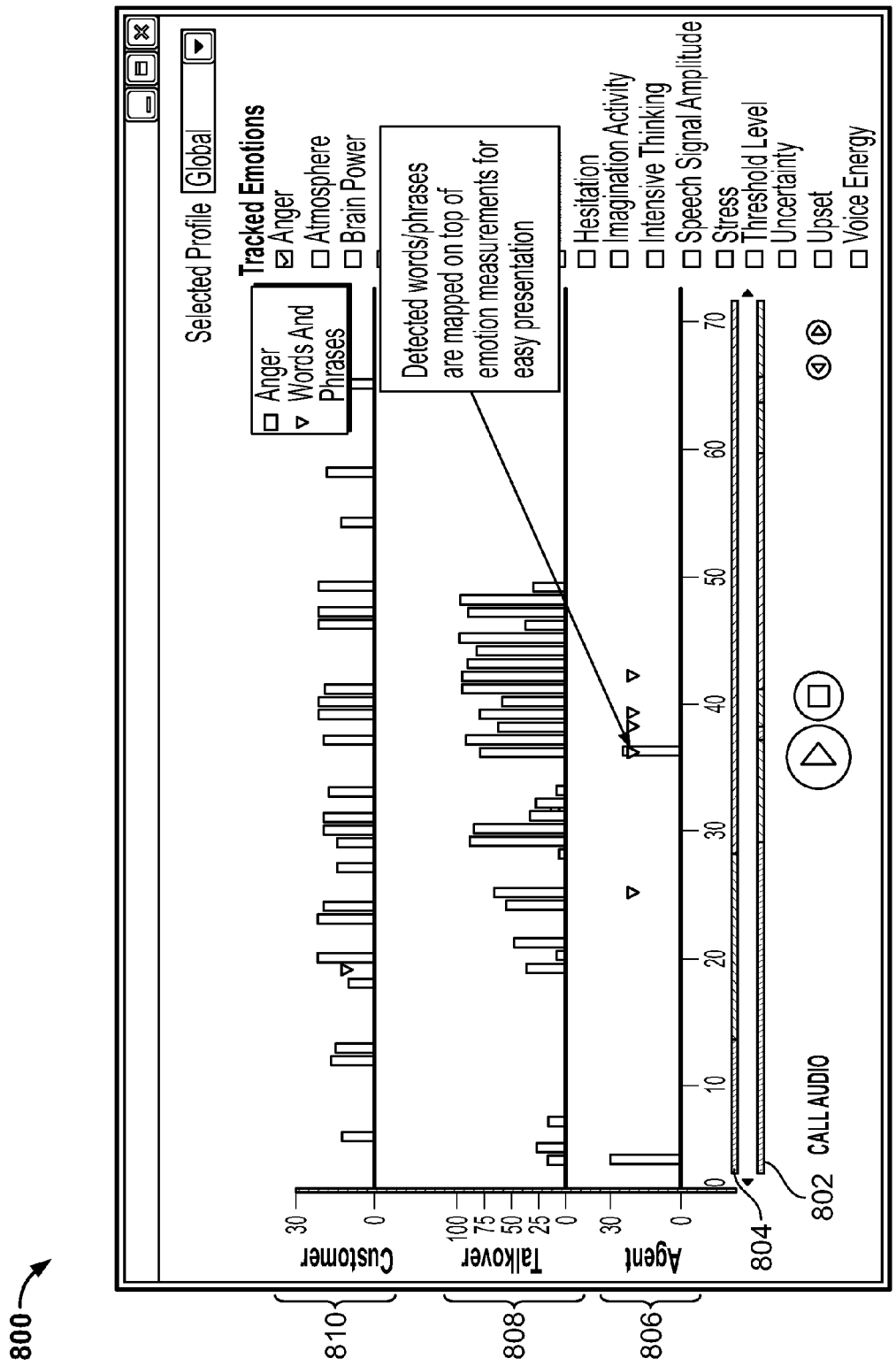
FIG. 8 is a schematic summary of a recorded agent-customer conversation with event tags according to an illustrative embodiment of the disclosure.

FIGS. 1A-D depict overall systems used in call centers that have emotion analysis and word/phrase detection capabilities. FIGS. 2A-3 relate to the configuring and setting up of an emotion analysis engine to determine emotion scores and visual representations of such scores. FIGS. 4A-B and 5A-B relate to the configuring and setting up of a word/phrase detection engine. FIGS. 4C and 5C relate to the configuring and setting up of a targeted data detection engine. FIGS. 6A-B depict an emotion level meter used to indicate agent and customer emotion levels based on the emotion analysis. FIGS. 7-9 depict various aspects of real-time and post-call analysis of calls between agents and customers. FIGS. 10A-12 depict processes associated with generating and displaying visual representations of call analysis performed at a call center.

Figure 1A:
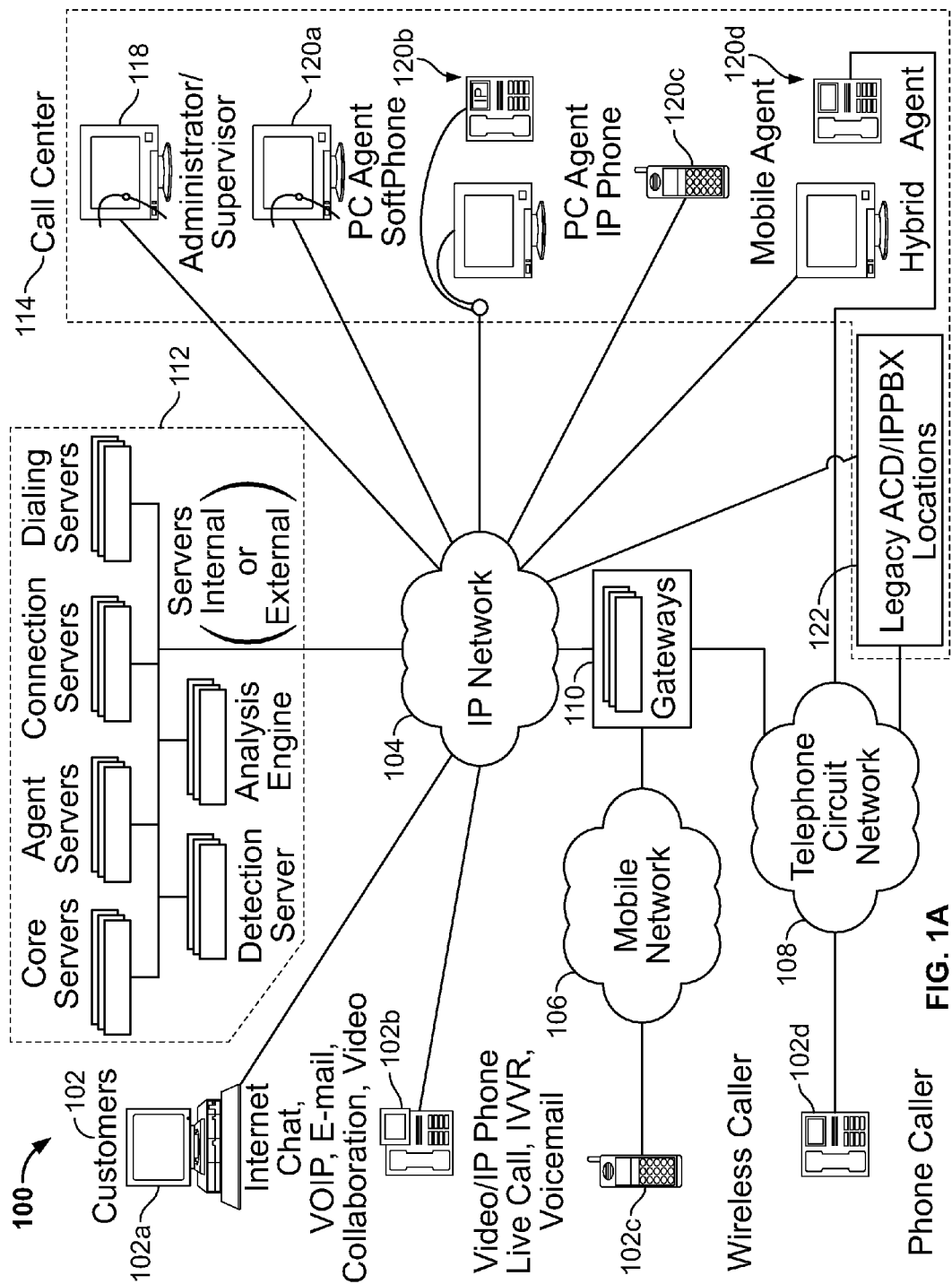
FIG. 1A depicts a telecommunications system including a call center according to an illustrative embodiment of the disclosure.

More particularly, FIG. 1A depicts a telecommunications system 100 including a call center 114, which may communicate with customer stations 102 via various communications networks. Customers may use various electronic devices to talk to call center agents. A customer may use an internet-enabled device 102a, such as a personal computer (PC) or internet-connected television, to communicate via online chat, VoIP, e-mail, or videoconference (e.g., Skype). Customers may also make and receive calls via video/IP telephones (102b), wireless or mobile telephones (102c), including smart telephones, or landline telephones (102d). Communication devices at customer stations 102a and 102b may be connected directly to IP network 104. A communication device at customer station 102c may be connected to a mobile network 106, which may interface with IP network 104 via one or more gateways 110. A communication device at customer station 102d may be connected to a telephone circuit network 108, such as a public switched telephone network (PSTN), which may interface with IP network 104 via one or more gateways 110. In some embodiments, customer calls may be transmitted over time-division multiplexing (TDM) primary rate interface (PRI), integrated services digital network (ISDN) PRI lines, or session initiation protocol (SIP) trunks.

IP network 104 transmits information, including voice signals, between customer stations 102 and call center 114. In some embodiments, call center 114 may be a captive call center (i.e., a functional area within an organization). In some embodiments, call center 114 may be an outsourced call center (i.e., a separate facility run by a third party that exists solely to answer inbound or place outbound calls). Call center 114 may be a sophisticated voice operations center that provides a full range of high-volume, inbound or outbound call-handling services, including customer support, operator services, directory assistance, multilingual customer support, credit services, card services, inbound and outbound telemarketing, interactive voice response, and web-based services.

Call center 114 may have multiple agent stations 120, from which agents communicate with customers and view data using various electronic devices, such as a PC softphone (120a), PC and IP phone (120b), or mobile phone (120c), that are connected to IP network 104. At agent station 120d, an agent may view data on a PC connected to IP network 104 while speaking to a customer on a landline telephone connected to telephone circuit network 108. It should be understood that call center 114 may have any number of each type of agent station 120a, 120b, 120c, and 120d, or may only have certain types of agent stations (e.g., only stations having PCs with IP phones, or some stations with mobile phones and some with PC softphones), and that the number of customer stations 102 may be much greater than the number of agent stations 120 at call center 114. It should be understood that data (e.g., audio signals, customer information, profile information) transmitted over networks 104, 106, and 108 may be in analog or digital format, and that digital data may be transmitted over the networks in data packets.

Audio signals are received at an agent station 120 from a customer station 102 via a customer call channel. Each agent station 120 may have a display screen for displaying indicators of agent and customer emotion levels, as well as instructions and alerts for the agent. The displayed indicators may be various gradations of color that are representative of calculated agent and customer emotion scores, as discussed below with respect to FIGS. 3 and 6A-B. Other equipment may be included within each agent station 120 without departing from the spirit and scope of the present disclosure.

Call center 114 may have legacy ACD/IP PBX locations 122, which are connected to IP network 104 and telephone circuit network 108, for routing calls. In some embodiments, ACD/IP PBX locations 122 may include one or more dialers and/or soft-switches. Customer calls may be connected to a private branch exchange (PBX) of the call center, and then routed either to a voice response unit (VRU) or an automatic call distributor (ACD). If a call is routed to a VRU, which may be interactive, the caller hears an automatic response and may obtain information or access self-service functions by pushing buttons (dialing) or speaking to the VRU. A customer who requests connection to an agent is routed to the ACD, which is a specialized router designed to route calls to individual agents at the call center. ACD may access servers 112 via IP network 104 to obtain information on customers and agents so that calls can be routed to the appropriate agents. For example, a customer's information such as caller ID and the record of interaction at the VRU may be used to identify the customer, and then the ACD may retrieve the identified customer's language, priority, and type of requested service from a customer data server (e.g., core servers in FIG. 1A). Agents may log into the ACD from agent stations, and an agent's login ID may be used to retrieve information from a server (e.g., core servers in FIG. 1A) on the agent's types and levels of skills. Computer-telephone integration (CTI) may be used to enable sophisticated routing at the ACD and the display of customer information at an agent station.

Servers 112 are connected to IP network 104, and may be internal or external to call center 114. In some embodiments, certain servers are internal to call center 114 and other servers are external. In some embodiments, call center 114 may be a premised based call center (e.g., all servers are internal to call center 114 and use a telecommunications service provider or internet service provider [TSP/ISP] to access IP network 104). In some embodiments, call center 114 may be a hosted call center (e.g., all servers are external to call center 114 and maintained by a hosted call center provider). Servers 112 may include core servers, agent servers, connection servers, dialing servers, detection servers, and analysis engines. Core servers may store routing and administrative information (e.g., customer telephone numbers and addresses), usage statistics, and event and activity logs. In some embodiments, core servers may store recordings of audio signals of all conversations between call center agents and customers on all customer call channels. In some embodiments, recorded conversations may be stored with event tags, as discussed further with respect to FIG. 8.

Agent servers may monitor and record agent interactions with customers and perform voice activity detection. Connection servers may enable voice, chat, and video (e.g., video interactive voice response [IVR]) communications and messaging features. Dialing servers may host predictive engines (e.g., for determining the identity of a caller), execute predictive dialing logic, and manage calling campaigns (e.g., determine who to call, keep track of who to call and who has been called).

Detection servers may enable detection of emotions, words, phrases, and/or data as discussed below with respect to FIGS. 2A-C, 4A-C, 5A-C, and 10A-12. Detection servers may have audio analyzer circuitry for executing a computational process that examines the bi-directional audio stream between an agent station and customer station to identify specific spoken or unspoken words. The words to be identified may be on a keyword list originating from a specific pre-defined dictionary stored in memory. Detection servers may include a speech recognition system, such as one that uses Automatic Speech Recognition (ASR) techniques, for detecting the presence or absence of words or phrases spoken during conversations between agents and customers. Detection servers may also include a database of word/phrase base expressions for evaluating conversations between agents and customers, as discussed further with respect to FIGS. 4A-B and 5A-B.

Analysis engines may generate visual displays based on emotion levels, calculate statistics, and generate alerts and reports, as discussed below with respect to FIGS. 3 and 6-10. Analysis engines may include an emotion analysis engine, which includes circuitry for analyzing emotion levels of call center agents and customers in real-time. The emotion analysis may take into account a person's voice inflection, tone, and volume. An emotion analysis engine may access a database of emotion base expressions for analyzing agent and customer emotion levels, as discussed further with respect to FIGS. 2A-3.

In some embodiments, one or more servers 112 may support multiple campaigns with no limit on scalability, and may provide ACD/IVR applications and/or answering machine detection (AMD). In some embodiments, servers 112 may include a third party customer relationship management (CRM) server. A CRM server may be customized to handle any process complexity (e.g., help desk, telemarketing), and may be kept separate from core applications for security reasons.

In some embodiments, servers 112 may have a multi-threaded interface, which may include one or more soft-switches. The multi-threaded architecture, discussed further with respect to FIG. 1D, allows servers 112 to process the analysis from two separate analysis engines without special consideration for either, allowing scalability and extensibility to support simultaneous real-time analysis of conversations at thousands of agent stations.

Call center 114 may include one or more administrator or supervisor stations 118 with one or more electronic devices coupled to IP network 104. A supervisor station 118 may receive audio signals of a plurality of conversations between agents and customers via a plurality of customer call channels. A supervisor at supervisor station 118 may use a telephone to listen in on or participate in conversations between agents and customers, or to have a private conversation with an agent. A supervisor station may also have a device (e.g., PC) with a display screen used to display emotion level and word/phrase information for a plurality of call center agents and customers. In some embodiments, gradations of color that are representative of emotion scores calculated for a plurality of agents and customers may be displayed on the display screen. Supervisor station 118 may receive alerts that an alert processor sends based on calculated customer and agent emotion scores and detection of designated words for a plurality of conversations between agents and customers. For example, the alert processor may send an alert to be displayed on a supervisor's display screen when a customer has several consecutive calculated emotion scores that exceed an emotion score threshold.

Supervisor station 118 may include a keyboard for typing messages or instructions to be sent to one or more agent stations. In addition, supervisor station 118 may include speakers for replaying recorded conversations between call center agents and customers in order to evaluate agent performance and compliance with regulations, or for sounding audible alerts sent from the alert processor. Other equipment may be included within supervisor station 118 without departing from the spirit and scope of the present disclosure.

Call center 114 may include a building or other structure for housing agents who work at agent stations 120 and supervisors who work at supervisor stations 118. Optionally, call center 114 may be a virtual call center in which remote agent stations 120 and remote supervisor stations 118 scattered throughout the world are connected through a private or public network to one another and to servers 112. In some embodiments, call center 114 may include one or more locally housed agent stations as well as one or more remote agent stations, which may be in multiple locations. In some embodiments, call center 114 may include one or more locally housed supervisor stations as well as one or more remote supervisor stations, which may be in multiple locations. In some embodiments, call center 114 may be a domestic call center (i.e., call center and customers are located in the same country). In some embodiments, call center 114 may be an international call center (i.e., call center is located in one country and one or more customers are located in a different country).

Agent stations 120, administrator/supervisor stations 118, and one or more internal call center servers may be communicatively coupled to one another via a local area network (LAN). The LAN may support an internet protocol router (IPR) within call center 114. The IPR is adapted to provide direct internet access to the LAN in a continuous manner, and enables bi-directional data and communication flow within call center 114, as well as between call center agents at agent stations 120 and customers at customer stations 102 connected to the internet.

Figure 1B:
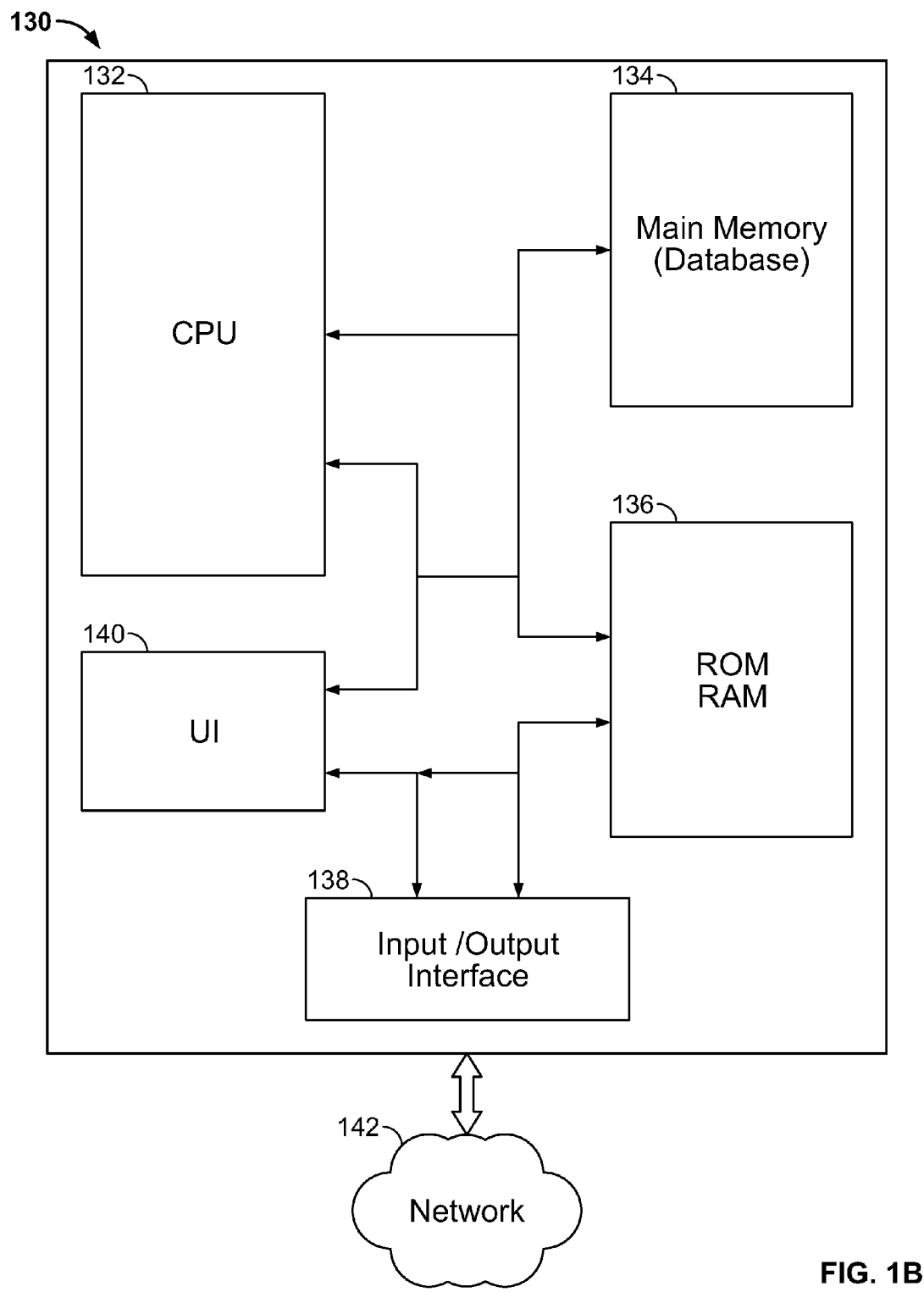
FIG. 1B depicts the physical components of a processor of a server according to an illustrative embodiment of the disclosure.

FIG. 1B depicts the physical components of a processor 130 of a server, such as one of servers 112 of FIG. 1A. Those skilled in the art will realize that each of the servers in FIG. 1A may include some or all of the components described in FIG. 1B. Processor 130 includes a central processing unit (CPU) 132, a memory 134 that includes a database, and an interconnect or communications bus coupling these components together. CPU 132 may include a single microprocessor or a plurality of microprocessors for configuring processor 130 as a multi-processor system. Memory 134 illustratively includes a main memory and a read only memory. Processor 130 also includes mass storage device 136 having, for example, various disk drives, tape drives, FLASH drives, etc., and includes databases in some exemplary embodiments. Memory 134 may include dynamic random access memory (DRAM) and high-speed cache memory, and includes databases in some exemplary embodiments. In operation, memory 134 stores at least portions of instructions and data for execution by CPU 132.

Mass storage 136 may include one or more magnetic disk or tape drives or optical disk drives for storing data and instructions for use by CPU 132. Mass storage system 136 may also include one or more drives for various portable media, such as a floppy disk, a compact disc read only memory (CD-ROM), DVD, or an integrated circuit non-volatile memory adapter (i.e. PC-MCIA adapter) to input and output data and code to and from CPU 132.

CPU 132 may also include one or more input/output interfaces for communications, shown by way of example as interface 138 for data communications via network 142. Network 142 may include one or more fusion servers, EBIF servers, provisioning servers, or other suitable devices. Data interface 138 may be a modem, network card, serial port, bus adapter, or any other suitable data communications mechanism. To provide the functions of a server 112 according to FIG. 1A, data interface 138 may provide a relatively high-speed link to a network 142, such as the internet 104 (FIG. 1A). The communication link to network 142 may be, for example, optical, wired, or wireless (e.g., via satellite or cellular network).

CPU 132 also includes suitable input/output ports to couple to the interconnect bus for interconnection with a local user interface 140 serving as a local user interface for programming and/or data retrieval purposes. Alternatively, personnel may interact with processor 130 for controlling and/or programming the server from remote terminal devices via the network 142.

Processor 130 may run a variety of application programs and store associated data in a database on mass storage 136. One or more such applications may enable the receipt and delivery of messages to enable operation as a server, for implementing server functions relating to receiving application data and/or subscriber data thereby enabling application intelligence by the system 100 of FIG. 1A.

FIG. 1C is a block diagram 150 depicting the interactions between various functional modules of the systems of FIG. 1A-B according to an illustrative embodiment of the disclosure. The modules illustrated in FIG. 1C and others described in the present disclosure may reside on one or more servers 112, agent stations 120, or supervisor stations 118, or a combination thereof. The modules may be implemented in hardware or software, or a combination thereof.

In FIG. 1C, voice activity detection (VAD) module 154 receives audio feed 152 as stereo input. The VAD module may determine, during a conversation between an agent and a customer, whether the agent or the customer is speaking, or if both are speaking at the same time (i.e., "talkover"). A conversation between an agent and customer may occur over a split channel, one side being the agent side and the other side being the customer side. In certain embodiments, voice analysis, including emotion analysis and word/phrase detection, is performed for an agent when voice activity is detected on the agent side of a call channel. Similarly, voice analysis, including emotion analysis and word/phrase detection, may not be performed for a customer until voice activity is detected on the customer side of a call channel. VAD and analysis on the agent side of a call channel may be performed independently of VAD and analysis on the customer side of the call channel, although the detection and analysis may be performed simultaneously for both sides. In some embodiments, initial voice activity on the customer side of a call channel may be ignored until voice activity on the agent side of the call channel is detected (e.g., analysis on the customer side of the call channel does not begin until after analysis on the agent side of the call channel begins).

When voice activity (e.g., on left and right channels) is detected by VAD module 154, emotion analysis engine module 156 and word/phrase detection engine module 158 may be activated. Emotion analysis engine module 156 and word/phrase detection engine module 158 may apply logic that starts and stops the analysis for agent and customer sides of a call channel based on definable criteria supported by VAD module 154.

Emotion analysis engine module 156 may be used to generate emotion analysis data, including emotion scores for agents and customers, in real-time. The emotion scores may be directly correlated to emotion levels of the agents and customers (e.g., for the emotion of anger, a high emotion score may be generated when emotion analysis engine module 156 determines that an agent or customer is very angry). In some embodiments, all generated emotion scores for agents as well as customers may be stored in a memory, and may be used to generate summaries or reports, as discussed further with respect to FIGS. 8 and 9. Alert processor module 172 may use emotion analysis data generated by emotion analysis module 156 to determine whether an emotion-related expression evaluates to true. Notification alerts and actions may be initiated when an emotion-related expression evaluates to true.

Word/Phrase detection engine module 158 may generate word/phrase analysis data and detect, in real-time, whether specified words or phrases are spoken during a conversation between an agent and a customer. Detected words/phrases may be directly correlated to words/phrases spoken by the agents and customers, and notification alerts and/or actions may be initiated based on the detection of certain words/phrases (e.g., "bankruptcy"). Alert processor module 172 may use word/phrase analysis data generated by word/phrase detection engine module 158 to determine whether a word-related expression evaluates to true. Notification alerts and actions may be initiated when a word-related expression evaluates to true.

Word dictionaries module 162 may store one or more dictionaries of words and phrases that may be detected by word/phrase detection engine module 158. A word dictionary may be a pre-defined list of distinct words (100 words or less) with no specific ordering. Word dictionaries are generally stored as non-editable lists of words and are used for reference only. Word dictionaries may be agent-specific or customer-specific, or include different languages. In some embodiments, word dictionaries may be swapped on the fly in accordance with different agent types and styles.

Keyword lists module 166 may use word dictionaries stored in word dictionaries module 162 to create various keyword lists, which may be used by word/phrase detection engine module 158. A keyword list represents a list of target words to be identified during word/phrase analysis. Word/Phrase detection engine module 158 may use multiple keyword lists while analyzing various conversations on different customer call channels. A keyword list may be a random list of selected words from a specified dictionary, an ordered list of words (i.e., phrase) from a specified dictionary, a full referenced dictionary, or any combination of the above. An agent's supervisor or a call center administrator with the appropriate privileges can use keyword lists module 166 to define one or more keyword lists to include words from one or more stored dictionaries, display stored keyword lists (e.g., on a supervisor's/administrator's display screen), and modify keyword lists as needed. Defined keyword lists may be passed as arguments to word/phrase detection engine module 158. Keyword lists module 166 may receive requests to modify defined keyword lists, for example by deleting some words and adding others.

Targeted data detection engine module 160 may be used to make internal/external application data available and to identify targeted data (e.g., a customer's zip code or state of residence) pertaining to a conversation between a customer and an agent. Targeted data detection engine module 160 may be used in conjunction with emotion analysis engine module 156 and word/phrase detection engine module 158 for real-time analysis of conversations between agents and customers. Alert processor module 172 may use targeted data analysis data generated by targeted data detection engine module 160 to determine whether a data-related expression evaluates to true. Notification alerts and actions may be initiated when a data-related expression evaluates to true.

Data dictionaries module 164 may store one or more dictionaries of data that may be detected by targeted data detection engine module 160. Data dictionaries are generally stored as editable lists of data and are used for reference only. Targeted data detection engine module 160 may reference multiple data dictionaries while analyzing various conversations on different customer call channels. In some embodiments, data dictionaries may be swapped on the fly.

Expression builder module 170 allows emotion analysis, word/phrase detection, and targeted data detection to be combined. Expression builder module 170 enables more precise identification, action, and reporting of compliancy events by developing a context for detected emotions, words/phrases, and targeted data, reducing the number of false-positives and false-negatives that occur with phonetic analysis, and thus reducing the number of unnecessary alerts that are sent to agent and supervisor stations. By combining real-time emotion, word/phrase, and targeted data analysis of audio data from agents and customers, a more coordinated and accurate determination of call compliancy is possible.

Expression builder module 170 provides expression builder screens for creating (also referred to herein as "building") base expressions and composite expressions. Three base expression types may be created using expression builder module 170 for defining emotion events, word/phrase events, and data events, respectively. A base expression is a named binary expression whose supported operations may include AND, NOT, OR, !=, ==, +, /, −, *, etc., and may include parentheses (i.e., '(' and ')') and quotation marks (","). There may be 0 . . . N base expressions for each of the analysis types, and each base expression may have a unique name that is saved to an expression list once the expression is defined. A composite expression may be created by combining one or more of the base expression types using logical operators (e.g., AND, OR). A composite expression may be created directly from the expression list. Each base expression and composite expression may have expression properties that define how the expression is evaluated.

Base expressions and composite expressions may be used to determine when an event should be generated. If an expression evaluates to true (e.g., logical '1') during real-time analysis of an audio channel, an event (e.g., emotion event, word/phrase event, data event, composite event) may be generated. Base expressions and composite expressions may also be referred to herein as event profiles (e.g., emotion event profiles, word/phrase event profiles, data event profiles, composite event profiles). In some embodiments, each generated event (e.g., emotion event, word/phrase event, data event, composite event) may be stored with a timestamp of when the event was generated, along with other information related to the circumstances under which the event was generated. The stored events and related information may be retrieved to generate call reports and summaries, and/or to evaluate agent performance.

An expression builder screen may be divided into two halves, one representing the agent side and the other representing the customer side of a call. A top section of an expression builder screen, which may be common to both halves, may be used to identify the type of expression to be built. For example, a user may select between the emotion, word/phrase, data, and composite types from a drop-down menu. An expression builder screen may have an expression build area, where elements (e.g., emotion types, words/phrases, targeted data, logical operators) may be selected (e.g., from a pop-up/drop-down menu) to be added to the expression. Each of the agent and customer halves of the screen may have its own expression build area. An expression build area may have an input area for the user to specify an expression name by which the created expression may be identified.

One type of base expression is an emotion base expression, which is a named binary expression that includes emotion types (e.g., anger, uncertainty, stress, embarrassment, hesitation, excitement) and logical operators (e.g., AND, NOT, OR). Parentheses (i.e., '(' and ')') may be used to group emotion types and logical operators within an emotion base expression. An exemplary expression for an emotion base expression according to an embodiment of the disclosure is:

(Anger AND Stress) OR (Talkover), in which the emotion types are anger, stress, and talkover. Emotion analysis engine module 156 may generate emotion scores for each emotion type during evaluation of a conversation between an agent and a caller. For each emotion type, a score range may be specified and a smaller range of scores within the full score range may be designated as "normal" for the emotion. Different emotion base expressions may be created for an agent side and a customer side of a call. A user may specify values for various expression properties (e.g., window size, frequency thresholds) for an emotion base expression, as discussed further with respect to FIGS. 2A-C.

In some embodiments, when a user selects an emotion type in an expression build area, the user may also input a threshold value for an emotion score for the selected emotion type to include in the emotion base expression. For example, a user may select emotion type "anger" and input a threshold value of 20, and "(anger>20)" may be added to the expression. If a threshold is not specified, a default threshold may be used, although the threshold value may not appear in the expression.

Another type of base expression is a word/phrase base expression, which is a named binary expression having one or more words (e.g., "hate", "lawyer") and/or phrases (e.g., "date of birth", "talk to a manager"). A word/phrase base expression is built by combining words from one or more word dictionaries. In some embodiments, there may be an inferred OR between each word in a word/phrase base expression. Different word/phrase base expressions may be created for an agent side and a customer side of a call. A user may specify values for various expression properties (e.g., start/stop time, event type) for a word/phrase base expression, as discussed further with respect to FIGS. 4A-B and 5A-B.

A third type of base expression is a data base expression (which may also be referred to as an arithmetic base expression or data portion base expression). Data base expressions may have data variables used to detect certain types of data during a call. The data to be detected may be referred to as "targeted data". There may be no differentiation between agent and customer sides for data base expressions.

A data base expression is a named binary expression that combines targeted data using logical operators (e.g., AND, OR) and/or arithmetic operations (e.g., !=, ==, +, −, *, <, >). Targeted data may include metadata (which may be stored as a data dictionary), internal application data, external application data, and data retrieved via functional calls, web service calls, and calls to application programming interfaces (APIs). An example of targeted data is the state from which a caller is calling; such targeted data may be detected using the illustrative data base expression "(State=NY OR State=MA OR State=CA)".

In order to create a data base expression, a definition of a data transport mechanism may be required to support data transport (e.g., from internal/external applications) into expression builder module 170. A data transport mechanism may be defined through a data dictionary, which may be selected from a pop-up/drop-down menu in an expression build area of an expression builder screen. In some embodiments, when a data dictionary is selected, a user may also select a variable to specify a category of targeted data (e.g., a caller's state of residence, a caller's zip code) to be detected. Data may be collected for data dictionaries using various methods, including embedded APIs, extraction transformation load utilities, and other standard techniques such as File Transfer Protocol (FTP). In some embodiments, a dictionary template setup may be used to create a data dictionary. The dictionary template setup may allow variable names, variable types, data types of variables, and descriptions of variables to be defined for a data dictionary. In some embodiments, data dictionaries may be created and/or stored in data dictionaries module 164.

A composite expression is a named binary expression created by combining base expressions using logical operators (e.g., AND, OR). A composite expression may be a homogenous expression of one base expression type, or may have any combination of base expression types. In some embodiments, a composite expression may include one or more emotion base expressions, one or more data base expressions, and at most one word/phrase base expression. In some embodiments, there may be an inferred AND between base expressions in a composite expression.

To create a composite expression, base expressions may be selected (e.g., by name) from an expression list, which may include all base expressions (or names of all base expressions) that have been created. The selection of base expressions may be made from a pop-up/drop-down menu in an expression build area of an expression builder screen. Different composite expressions may be created for an agent side and a customer side of a call.

A composite expression may disregard alerts generated individually by each of its component event profiles, instead delivering its own alerts tailored to the combination of characteristics between its component event profiles and their properties. A composite event profile operates independently from other event profiles, having its own event and alert notification actions. For example, while use of an emotion event profile involves examining the frequency of occurrence of threshold violations over a specified window (see discussion of FIG. 3), use of a composite event profile may involve using the historical window of an emotion event profile to determine when an emotion event should be generated, as well as concurrently checking whether any words and/or phrases defined in a word/phrase event profile were detected during the historical window. An exemplary expression for a composite event profile according to an embodiment of the disclosure is:

(Base Expression Name 1 AND Base Expression Name 2), where Base Expression Name 1 could be an emotion base expression and Base Expression Name 2 could be a word/phrase base expression. If Base Expression Name 1 and Base Expression Name 2 both evaluate to true, an alert/event may be generated for the composite expression. If Base Expression Name 1 evaluates to true but Base Expression Name 2 does not, then an alert/event would not be generated for the composite event profile, although an alert/event may be generated for the emotion event profile corresponding to Base Expression Name 1 if Base Expression Name 1 is in use separately from the composite event profile. The ability to logically combine multiple expressions provides the flexibility of developing higher priority events in cases where a composite event profile contradicts another event profile.

In some embodiments, created base/composite expressions may be immutable. To change an existing base/composite expression, it may be necessary to create a new version of the expression and mark the new version as active. When a new version of a base/composite expression is created, the result of the change may be reflected in any composite expression that references the changed expression.

Base expressions and composite expressions may be assigned to abstract profiles, which may be used to create default profiles and custom profiles. The purpose of an abstract profile is to update all default profiles and custom profiles related to the abstract profile. Profiles module 167 provides the means to manage abstract, default, and custom profiles, such as associating expressions with a profile and adding profile properties such as timers, nesting, exceptions/triggers, and actions. In some embodiments, profiles module 167 may automatically create a number of abstract profiles equal to the number of dictionary models raised to the power of the number of channels. For example, if there is a dictionary model for the agent side of a call and a dictionary model for the customer side of a call (i.e., 2 dictionary models), and an agent channel and a customer channel (i.e., 2 channels), profiles module 167 may automatically create $2^2=4$ abstract profiles, each abstract profile corresponding to a combination of dictionary model and channel.

Profiles module 167 may allow the user to designate a system-generated abstract profile as a named default profile, or allow creation of named custom profiles. A custom profile may also be designated as a default profile, but only one default profile, abstract or custom, can be designated for use with each audio channel. Only one default profile plus one custom profile can be active at any given time. A profile may have 0 . . . N expressions associated with it, and may also have various profile properties (e.g., nesting, exceptions). In some embodiments, profiles module 167 may provide a user interface having selectable icons that a user may use to add expressions and profile properties. For example, a user selection of an icon may cause a pop-up window to appear in which the user may select a base/composite expression to be added.

Profile properties include scoring, timers, nesting, exceptions, and actions. A user-defined scoring system may be set up to allow base/composite expressions to be scored so that each event can have a weighted score. A user may specify start and end timers for each base/composite expression in a profile to control when expressions are evaluated during a call.

Profiles module 167 provides the means to create nested expressions within a profile. Expressions may be designated as "parent" level, and each parent expression may have one or more designated "child" expressions. A child expression may not be evaluated unless its parent expression evaluates to true (e.g., the start timer and end timer values of a child base/composite expression may apply only when the parent expression evaluates to true).

Profiles module 167 also provides the means to designate exceptions. Exceptions allow any expression associated with an active profile to be substituted in real-time based on triggers. A trigger is made up of a trigger key (i.e., type of trigger) and a trigger value. Trigger values may be based on system metadata such as agent ID, extension, campaign, client, etc. Triggers may be assigned a global order of precedence. A user may create an exception for an expression in an abstract or custom profile by specifying a trigger key, a trigger value, and a replacement expression. A replacement expression may also be referred to herein as an exception expression (EE). An EE may override the original base/composite expression in the profile, but not its actions. Multiple exceptions may be created for an expression by specifying multiple trigger keys, trigger values, and replacement expressions (e.g., different replacement expressions may be used for different trigger keys/values). Each expression in an abstract or custom profile may have a list of exception expressions, with each EE having a trigger key and a trigger value.

When a trigger key and trigger value are detected during a call, the corresponding replacement expression may be evaluated instead of the expression for which the exception is created. For example, an emotion base expression may be set up to evaluate for anger and excitement, and also have an exception triggered by the ID number of an unusually mild-mannered agent (e.g., the trigger key may be "agent ID" and the trigger value may be the ID number of the agent). When the trigger key and value are found to apply to a call, the replacement expression may be an emotion base expression that has lower threshold values for anger and excitement.

Actions are another profile property. Profiles module 167 provides the means to assign an action to an expression in an abstract or custom profile. If the expression evaluates to true during a call for which the profile is applicable (active), the action is executed. Multiple actions may be specified for a particular expression. Actions may be classified as multiple occurrence or single occurrence. A single occurrence action executes only one time when an event is generated (i.e., when an expression evaluates to true), and multiple occurrence actions may repeat when an event is generated. An example of an action is sending a message or alert to an agent or supervisor desktop/station. Sending a message may be an action type of multiple occurrence or single occurrence. A user may specify multiple messages for the same expression. For each message, a user may specify where the message should go, what the message should say, what the priority of the message should be, a duration of the message, and/or how the message should be conveyed (e.g., with red letters, with flashing red letters).

Other examples of actions include a zone preemption call (e.g., a phone call to a designated party, such as a supervisor), management of system controls, an API or web service call, and reading or writing to a database. A zone preemption call may be an action type of single occurrence. Profiles module 167 may provide a user interface for assigning actions, and may further provide features to manage expression/action assignments that allow the user to enable or disable an assignment, mark an agent (e.g., turn information corresponding to an agent a certain color, and/or move the agent's information to the top of a display screen) at a supervisor desktop, or start evaluation of a child expression. By assigning actions to expressions, a call monitoring system may be managed dynamically. API calls may, for example, call an internal API (e.g., which may share data between internal applications or share data with external applications), call an external API, or call a web service. A user may specify a location (e.g., directory, file path) for each API/web service call. An API may be called to execute a function, such as muting a recording.

In some embodiments, the expressions selected for an abstract or custom profile may be displayed in a spreadsheet format. Each row in the spreadsheet may correspond to a different expression in the profile. The spreadsheet may have columns for expression name, expression number, level (e.g., parent, child), expression exceptions, start timers, end timers, and actions assigned.

Abstract and custom profiles may be used (i.e., active) simultaneously. An active profile may be used in measuring the variance between analysis results and event notification specifications. Special cases of the measured variances may be identified as events and stored. The first event of an active profile in use during a call may trigger an alert, which may be used to generate a preemptive action (e.g., generating a phone call to a supervisor/compliancy officer, or generating actionable choices such as coaching the agent, barging in on the call, or simply monitoring the call). Continuous processing of an audio stream against active profiles may result in the incrementing of the number of events, which may be displayed in a real-time report (discussed further with respect to FIG. 7). The total number of events identified/generated during a call may be stored and used to assess the overall quality of the call in a post-call report (discussed further with respect to FIG. 9). In some embodiments, the agent side and customer side of all calls may be scored, and a running event average may be maintained for the agent side and customer side of all calls. The event averages may be used to evaluate agent performance.

Abstract profiles are used to pass characteristics to default profiles and custom profiles. A default profile or custom profile may be created by specifying a dictionary model and a channel side to which the default/custom profile applies. A default/custom profile will automatically inherit the expressions and properties of the abstract profile corresponding to the specified dictionary model and channel side. When an abstract profile is changed, the change(s) may be propagated to all relevant default/custom profiles (i.e., default/custom profiles that inherit the expressions/properties of the abstract profile) by creating a new version of the relevant default/custom profiles.

A default profile inherits only the expressions and properties of the relevant abstract profile. In some embodiments, only one default profile for each abstract profile may be allowed. A default profile may be systemically generated or defined by a user (in which case the user may designate the default profile as such when the user creates the profile). In some embodiments, profiles module 167 may require at least one default profile to be active at all times. A default profile applies to all audio streams and is intended to provide a common specification for measuring variances. A default profile having at least one emotion base expression and at least one word/phrase base expression may always be present to provide the basis for a common language of quality and objective reporting if the default profile is always used and assessment of voice analysis scores is always present.

A custom profile inherits all expressions and properties of the relevant abstract profile, but has additional properties that may be added by a user when creating the custom profile. For example, a user may create an action in a custom profile that contains information specific to the custom profile, or add an occurrence limit to set a limit on an action of type multiple occurrence. Profiles module 167 may have only one default profile and one custom profile active at any time, although a custom profile may not be required. In some embodiments, a default/custom profile may include an emotion base expression designated as a root emotion expression (REE), which may be configured to drive state lights, such as an emotion level meter (discussed with respect to FIG. 6A), on an agent/supervisor desktop.

A custom profile is, by design, user-defined to any specification criteria. Custom profiles provide a means to set up agents differently from the default profiles and allow customized emotion analysis and word/phrase detection to be performed for different departments where different profiles are required. A custom profile may be based on the creation of triggers, which specify which audio streams will be processed. Each custom profile may include measurement variable selection and control settings, message content and messaging properties used to notify agent and supervisor stations, an event notification trigger (e.g., event profile trigger) that specifies which audio streams to analyze, and an expression setup used to combine measurement variables of interest.

A user may select a data dictionary (e.g., from a drop-down/pop-up menu) and/or keyword list when creating a default/custom profile, but only the data dictionaries/keyword lists that are required by expressions in the default/custom profile (e.g., expressions in the relevant abstract profile) may be available for selection. In some embodiments, only one data dictionary and one keyword list may be selected for each default/custom profile. In some embodiments, more than one dictionary and keyword list may be selected for a default/custom profile.

Alert processor module 172 uses default and/or custom profiles, expressions associated with these profiles, and assigned profile properties during call monitoring, and provides event notifications when events are generated. Alert processor module 172 may be used to evaluate expressions created with expression builder module 170 and associated to a profile by profiles module 167 for the detection and notification of events. Alert processor module 172 may evaluate an expression based on data received from emotion analysis engine module 156, word/phrase detection engine module 158, and/or targeted data detection engine module 160 by comparing analysis scores and data against user criteria (e.g., expression property values) in a default or custom profile. For example, if an active profile has an expression assigned to it that monitors the emotion of anger, and the expression evaluates to true, then notification alerts and actions may be initiated. Similarly, if an active profile has an expression assigned to it that monitors the word "bankruptcy", and the expression evaluates to true, then notification alerts and actions may be initiated.

Alert processor module 172 may generate alerts and send them to agent desktop module 174 based on calculated customer and agent emotion scores (e.g., calculated by emotion analysis engine module 156), detection of designated words/phrases (e.g., by word/phrase detection engine module 158), and/or detection of targeted data (e.g., by targeted data detection engine module 160). For example, alert processor module 172 may send an alert to be displayed on an agent's display screen (e.g., as part of a displayed emotion level meter) when the customer to whom the agent is speaking has several consecutive calculated emotion scores, calculated by emotion analysis engine module 156, that exceed an emotion score threshold value. An alert may be sent to an agent station if word/phrase detection engine module 158 has determined that the agent has not stated the "mini-Miranda" rights within a certain period of time after a conversation with a customer has begun. In some embodiments, alert processor module 172 may perform an action specified in profile properties of an active profile when a base/composite expression associated with the profile evaluates to true. In some embodiments, alert processor module 172 may generate an audible high-emotion alert, or an alert that the customer has repeatedly said a certain word, that is sent to and heard at an agent station. Alert processor module 172 may also send alerts to be displayed and/or heard at supervisor stations when the alerts are sent to agent stations. In some embodiments, alert processor module 172 may initiate a preemptive action, such as placing a phone call to a supervisor or compliancy officer. Alert processor module 172 may send data regarding emotion events, word/phrase events, and data events to agent desktop module 174 and supervisor desktop module 175, and may calculate statistics used by reports module 168 in generating real-time and post-call reports, as discussed further with respect to FIGS. 2A-6B and 10A-12.

Reports module 168 generates real-time and post-call reports for one or more agents based on assigned emotion scores and detected words/phrases and data, as discussed further with respect to FIGS. 7 and 9. Reports module 168 may generate reports based on data collected and/or calculated by emotion analysis engine module 156, word/phrase detection engine module 158, and targeted data detection engine module 160. The generated reports may be specific to one agent or contain information for a group (e.g., zone) of agents, and may compile information from multiple calls over time. The reports generated by reports module 168 may be displayed on a display screen (e.g., in spreadsheet format) at a supervisor/administrator station or printed on paper.

Figure 1D:
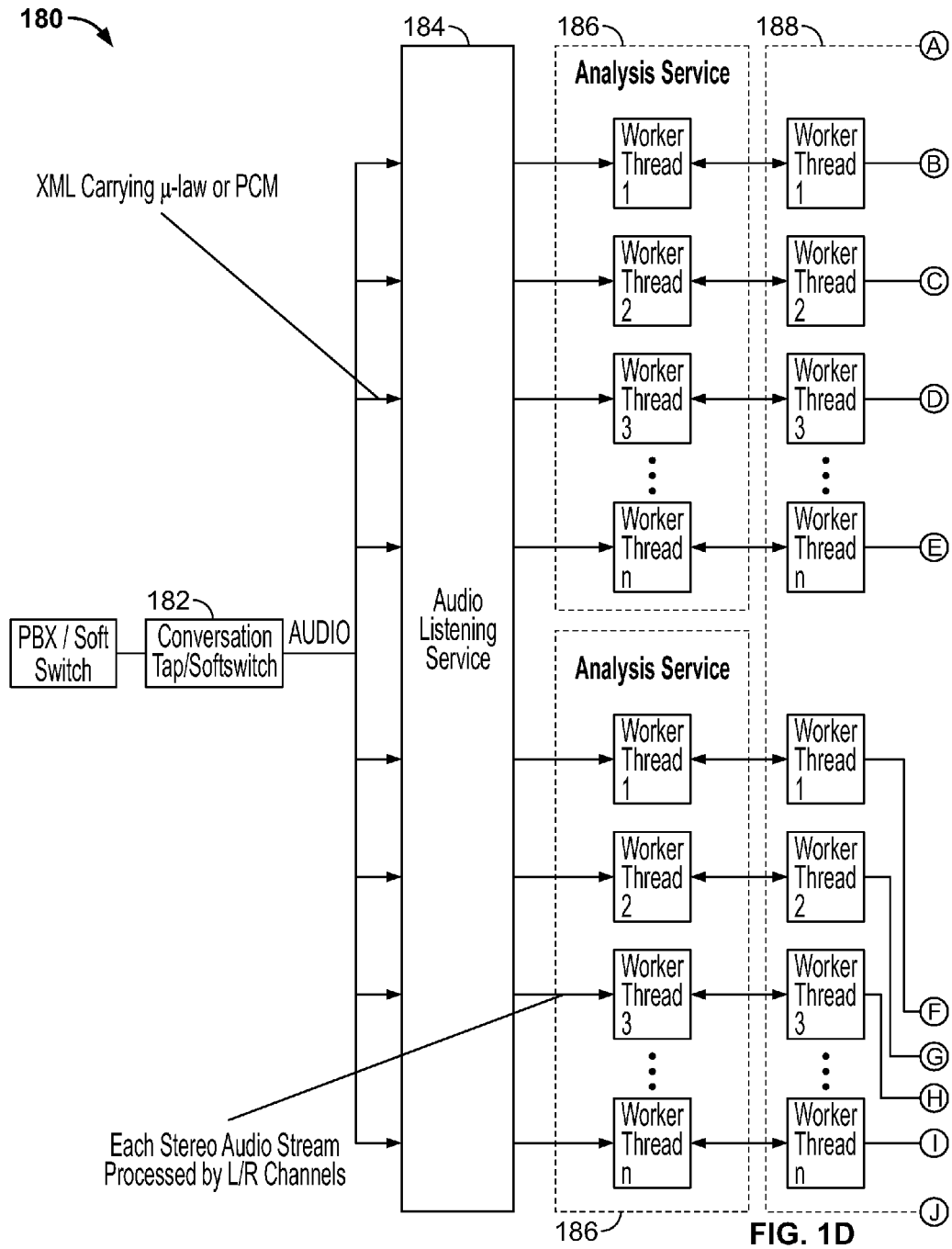
FIG. 1D depicts the interactions between various services implemented on the systems of FIGS. 1A-B according to an illustrative embodiment of the disclosure.
Figure 1D:
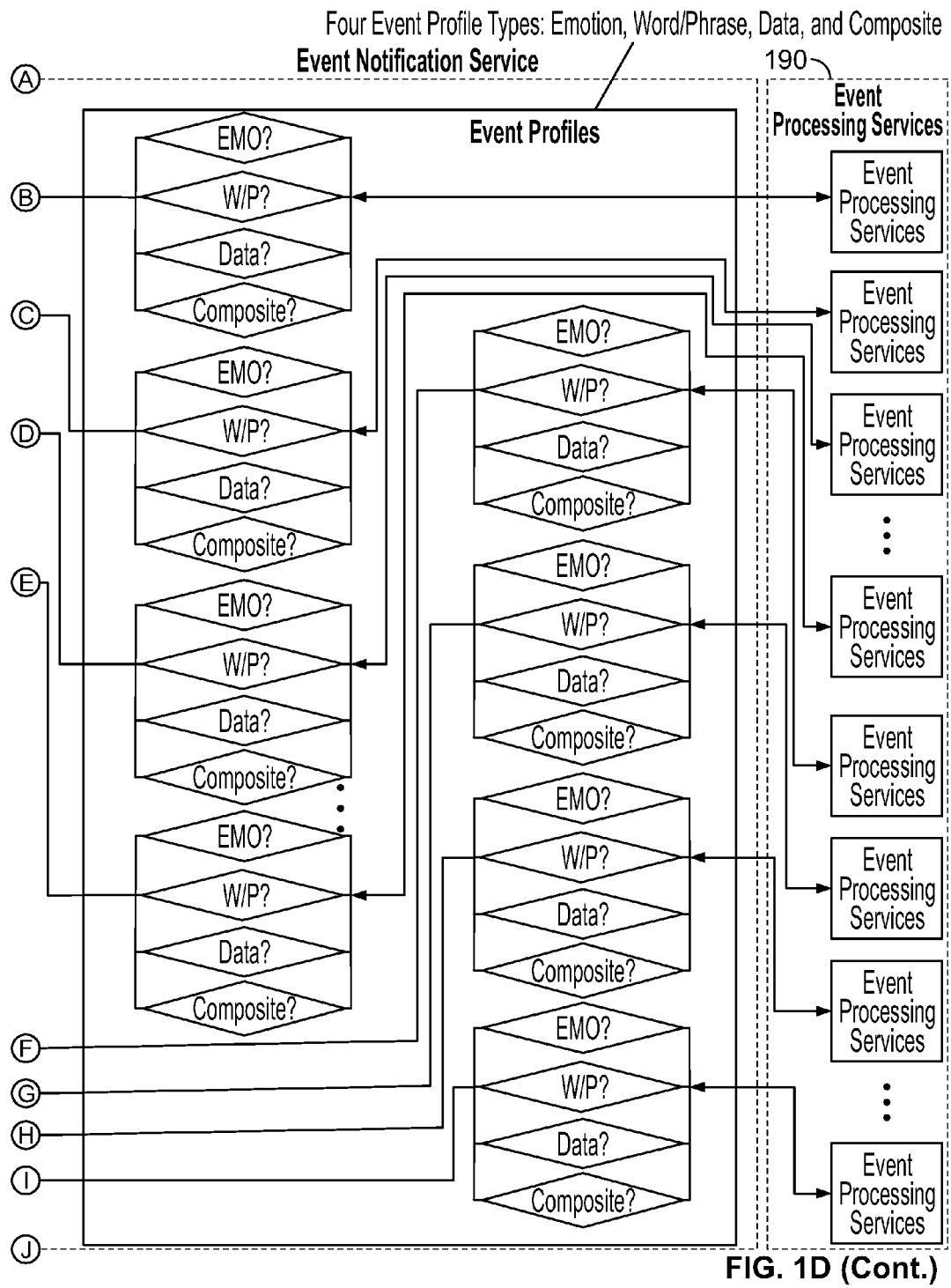

FIG. 1D is a block diagram 180 depicting the interactions between various services that are implemented on the systems of FIGS. 1A-C according to an illustrative embodiment of the disclosure. The services illustrated in FIG. 1D, which include audio listening service 184, analysis service 186, event notification service 188, and event processing services 190, may be performed on one or more servers (e.g., servers 112) having a multi-threaded architecture. Suitable architectures include block multi-threading, interleaved multi-threading, and simultaneous multi-threading. With a multi-threaded architecture, the services illustrated in FIG. 1D may be performed for multiple conversations between call center agents and customers at the same time, each audio stream corresponding to a different thread. To switch quickly between multiple active threads, a set of registers must be instantiated for each thread. Audio listening service 184, analysis service 186, and event notification service 188 may use dynamic allocation for multi-threading, but the extent to which such allocation occurs is limited by the computational resources of the server(s) on which the services run. Thus, horizontal scaling through hardware servers may be used.

In some embodiments, the audio streams from conversations between agents and customers may be processed as blocks of 12,000 bytes from each call channel. Each stream may be base-64 encoded for quality control and sent out as the text of Extensible Markup Language (XML)-tags. An audio stream received from a soft-switch or audio-tap 182 may be formatted using mu-law (μ-law) or pulse-code modulation (PCM) and sent as an XML stream to be processed by audio listening service 184. An XML header may describe the audio stream, and an XML tag may indicate whether the format is in μ-law or PCM, and whether the stream is in a stereo format. Audio listening service 184 may support all format variations. Audio listening service 184 listens for a connection between a call center agent and customer. In some embodiments, the audio listening service may be performed at least in part by VAD module 154 of FIG. 1C. Each time a connection between a call center agent and customer is recognized, audio listening service 184 may invoke an instance of analysis service 186 and the corresponding thread(s) may be dynamically generated.

Analysis service instances 186 may reside on one or more analysis engines, and may process the audio stream and return analysis results. In some embodiments, a stereo audio stream passed to an instance of analysis service 186 may have left and right (L/R) channel data that are processed separately. In some embodiments, instances of analysis service 186 may prompt function calls to emotion analysis engine module 156, word/phrase detection engine module 158, and/or targeted data detection engine module 160. The emotion analysis, word/phrase detection, and targeted data detection may be executed in separate threads.

Each instance of analysis service 186 dynamically generates an instance of event notification service 188 and the corresponding thread(s). Event notification service 188 uses the results returned from analysis service 186, along with predefined data from an event profile, to determine a variance. In some embodiments, the event notification service may be performed at least in part by alert processor module 172.

Each instance of event notification service 188 may dynamically generate an instance of event processing services 190 to process the variance into an action. Event processing services 190 represent a combination of services for processing actions to be taken at each agent and/or supervisor station, as well as data retrieval/storage services that may support an action by retrieving data from and/or storing data to a database. Event processing services in accordance with some embodiments of the disclosure are discussed further with respect to FIGS. 6A-7 and 10A-12. Each specific event processing service may use multi-threading techniques, but may not be dynamically generated in a similar one-to-one manner as the other services described above. Event processing services may be performed at least in part by reports module 168 and/or agent desktop module 174. In some embodiments, event notification service 188 and event processing services 190 may be combined or collectively referred to as "alert processor services."

FIGS. 2A-3 relate to the configuring and setting up of an emotion analysis engine to determine emotion scores and visual representations of such scores. FIG. 2A is a table 200 of exemplary expression properties and expression property values of an emotion base expression. An emotion base expression, its expression properties, and its expression property values, such as the values shown in table 200, may be stored in a server 112 (e.g., analysis engine) of FIG. 1A and accessible by a supervisor/administrator to control the operation of emotion analysis engine module 156 and/or alert processor module 172 of FIG. 1C. Table 200 includes fields for a window size 202, an emotion score threshold value 204, a yellow frequency threshold 206, an amber frequency threshold 208, a red frequency threshold 210, and an alert frequency threshold 212. It should be understood that the order of these fields is not necessarily of any particular significance, and that other fields may be included in table 200 instead of or in addition to the data described herein, as necessary or helpful to the effectiveness or robustness of an emotion base expression and emotion analysis.

The expression property value in window size field 202 designates a buffer size passed to an alert processor every second, or some other appropriate time interval. The buffer size may determine a number of consecutive emotion scores to compare to a threshold value for alert processing (e.g., performed by alert processor module 172) and/or driving state lights (e.g., in an emotion level meter) on an agent and/or supervisor desktop. The expression property value in emotion score threshold value field 204 designates an emotion score limit; agent or customer emotion scores that equal or exceed this limit too often will cause the alert processor to generate alerts.

Fields 206, 208, 210, and 212 of table 200 specify various frequency thresholds. The number to be compared to a frequency threshold may be calculated by dividing the number of emotion scores in the current window that exceed the emotion score threshold, by the window size, as discussed further with respect to FIG. 3. The expression property value in yellow frequency threshold 206 designates a percentage at or above which a yellow emotion light will be displayed at an agent station. The expression property value in amber frequency threshold 208 designates a percentage at or above which an amber emotion light will be displayed at an agent station. The expression property value in red frequency threshold 210 designates a percentage at or above which a red emotion light will be displayed at an agent station. The expression property value in alert frequency threshold 212 designates a percentage at or above which an emotion alert will be displayed at an agent station. The number to be compared to the frequency thresholds is calculated by dividing the number of emotion scores in the current window that are above the emotion score threshold value, by the window size. Example calculations are discussed below with respect to FIG. 3. In some embodiments, the expression property value for a yellow/amber/red/alert frequency threshold may designate a count threshold; if the number of times that an emotion score exceeds a specified emotion score threshold exceeds the count threshold during a window period, a red/yellow/amber/red light or alert may be displayed at an agent and/or supervisor desktop.

In some embodiments, expression properties of an emotion base expression may include a clearing count. For example, table 200 may include a clearing count field, which may include a clearing count value. A clearing count designates a time period for restarting yellow/amber/red/alert frequency calculations. If a period of silence equal to the designated time period is detected on a call channel, a new window of emotion scores will be used for yellow/amber/red/alert frequency calculations.

FIG. 2B is a data structure 230 for storing expression property values of an emotion base expression. Data structure 230 may be stored in a database in a memory, for example one or more of servers 112, and may include fields for a window size 232, an emotion score threshold value 234, a yellow frequency threshold 236, an amber frequency threshold 238, a red frequency threshold 240, and an alert frequency threshold 242. It should be understood that the order of these fields is not necessarily of any particular significance, and that other fields (e.g., a clearing count field) may be included in data structure 230 instead of or in addition to the data described herein, as necessary or helpful to the effectiveness or robustness of an emotion base expression and emotion analysis.

The expression property values of an emotion base expression, such as the values in table 200 and data structure 230, may be used during emotion analysis of audio signals as follows. An emotion analysis engine, which may be hosted on one of servers 112, takes a continuous audio feed as input and produces a continuous stream of analysis data for all the emotions supported by the emotion analysis model. During emotion analysis of an audio signal, the emotion analysis engine may calculate an emotion score for an agent or customer (depending on who is speaking) every second. In some embodiments, an emotion score may not be calculated for an agent until voice activity of the agent is detected on the call channel, and an emotion score may not be calculated for a customer until voice activity of the customer is detected on the call channel. Each score is passed to an alert processor (e.g., alert processor module 172). The alert processor stores the calculated emotion scores in a history buffer whose size is equal to the window size value. Data in the buffer is handled in a first in, first out (FIFO) fashion. The alert processor examines the last buffer and calculates the percentage of emotion scores equal to or exceeding the emotion score threshold value. In some embodiments, the alert processor examines the last buffer and calculates the percentage of emotion scores exceeding but not equal to the emotion score threshold value. This frequency calculation is used to determine gradations of color to be displayed and establish whether an alert should be displayed, and can also be used to initiate a preemptive action such as placing a phone call to the agent station from a supervisor station. In some embodiments, all values in the buffer are reset to zero if silence is detected on a call channel (i.e., VAD detects no sound from both the agent and the customer) for greater than some specified period of time, for example 10 seconds.

In some embodiments, the expression property values in table 200 and data structure 230 are the values for a default profile for emotion analysis. Expression property values in a default profile may be dynamically adjusted to create a custom profile for emotion analysis for a particular agent in accordance with the following procedure. First, the default profile is used in emotion analysis and calls are identified that do not have emotion alerts (i.e., all calculated frequencies are below a specified frequency threshold). The mean emotion score of the call center agent population is calculated for the calls without emotion alerts. Second, each agent's mean emotion scores are computed for calls without system alerts. Each agent's mean emotion scores are then compared to the agent population mean, and the variance is calculated. Such calculations may be performed on one or more of servers 112, which may also generate a report based on such calculations. If an agent's variance is greater than some configurable value, a custom profile for emotion analysis for the agent with an adjusted window size and adjusted frequency thresholds for those emotions affected may be dynamically created on one or more of servers 112. The size of the adjustments is determined and controlled using mathematical formulas which examine the variance.

Custom profiles for emotion analysis may be created for different organizations and for individual agents based on personality to dampen effects of predisposed emotion. For example, conversations that occur at a debt collection department of a call center may naturally be more emotionally tense than conversations in other departments, and a custom profile may be created to reflect the heightened emotion levels. As another example, a custom profile for emotion analysis may be created for an individual agent who has an easily excitable personality. Expression property values for emotion base expressions in such a custom profile may be stored in a data structure, such as data structure 260 of FIG. 2C.

Data structure 260 may be stored in a database in a memory, for example on one or more of servers 112, and may include fields for a window size 262, an emotion score threshold value 264, a yellow frequency threshold 266, an amber frequency threshold 268, a red frequency threshold 270, and an alert frequency threshold 272. It should be understood that the order of these fields is not necessarily of any particular significance, and that other fields may be included in data structure 230 instead of or in addition to the data described herein, as necessary or helpful to the effectiveness or robustness of an emotion base expression and emotion analysis. The expression property values in the fields of data structure 260 are higher than those of data structure 230 because emotion levels for an easily excitable agent tend to be higher than average, and thus calculated emotion scores can be higher than normal before there is an actual cause for alarm.

Visual representations based on calculated emotion scores may be displayed in real-time on an agent station display screen during a conversation between the agent and a customer. FIG. 3 is a diagram 300 of how emotion light colors displayed at an agent station are set based on emotion scores according to an illustrative embodiment of the disclosure. The indicated emotion light colors (green, yellow, amber, and red) in diagram 300 are set based on the expression property values of data structure 230 using, for example, a process discussed with respect to FIG. 11. In FIG. 3, a series of calculated emotion scores 302 represents the output of an emotion analysis engine, which may be hosted on one or more of servers 112. The emotion analysis engine calculates an emotion score of an agent or customer (whoever is speaking) at regular intervals—for example, once per second. The window size defined in data structure 230 is 5, and thus an emotion light color is set for every five calculated emotion scores. Various gradations of color (e.g., a light sequence) correspond to increasing frequencies at which calculated emotion scores equal or exceed the emotion score threshold value; green and yellow lights correspond to lower frequencies, and amber and red lights correspond to higher frequencies. Above a certain frequency, an alert is sent to the agent station and a supervisor station for display. As shown in data structure 230, the emotion score threshold value is 15, the yellow frequency threshold is 0.2 (i.e., 20%), the amber frequency threshold is 0.4 (i.e., 40%), the red frequency threshold is 0.6 (i.e., 60%), and the alert frequency threshold is 0.8 (i.e., 80%).

Each of windows 304, 306, 308, 310, 312, 314, 316, 318, 320, 322, and 324 of FIG. 3 has five calculated emotion scores, consistent with the designated window size of 5 specified in data structure 230. The first emotion light color displayed based on series 302 is set based on the emotion scores in window 304. None of the emotion scores in window 304 equal or exceed the emotion score threshold value of 15. Therefore, the frequency at which scores in window 304 equal or exceed the emotion score threshold value of 15 is 0 out of 5, or 0%. In some embodiments, an emotion score may count in the frequency calculation if the score exceeds, but not if the score equals, the emotion score threshold value. This frequency, and all other frequencies, may be calculated on one or more of servers 112, which may also compare the calculated frequency of 0%, and all other calculated frequencies, to all of the frequency thresholds of the default profile for emotion analysis. Because the calculated frequency of 0% is lower than the yellow, amber, red, and alert frequency thresholds, a green emotion light is displayed on an agent display screen for the first window 304. Similarly, in window 306, all of the calculated emotion scores are lower than the emotion score threshold value of 15, so the calculated frequency is 0% and a green emotion light is displayed on the agent display screen for window 306.

In window 308, however, one of the five calculated emotion scores (i.e., 23) is equal to or higher than the emotion score threshold value of 15. Therefore, the frequency at which scores in window 308 equal or exceed the emotion score threshold value of 15 is 1 out of 5, or 20%. In some embodiments, an emotion score may count in the frequency calculation if the score exceeds, but not if the score equals, the emotion score threshold value. Because the calculated frequency of 20% is equal to the yellow frequency threshold but lower than the amber, red, and alert frequency thresholds, a yellow emotion light is displayed on the agent display screen for window 308. In some embodiments, the yellow emotion light may be displayed when the yellow frequency threshold is exceeded but not when the yellow frequency threshold is equaled. In some embodiments, a green emotion light may be displayed adjacent to the yellow emotion light on the agent display screen to show the light sequence (i.e., corresponding gradations of color) up to the highest frequency threshold that is met or exceeded.

In window 310, two of the five calculated emotion scores (i.e., 23 and 19) are equal to or higher than the emotion score threshold value of 15. Therefore, the frequency at which scores in window 310 equal or exceed the emotion score threshold value of 15 is 2 out of 5, or 40%. In some embodiments, an emotion score may count in the frequency calculation if the score exceeds, but not if the score equals, the emotion score threshold value. Because the calculated frequency of 40% exceeds the yellow frequency threshold and equals the amber frequency threshold, but is lower than the red and alert frequency thresholds, an amber emotion light is displayed on the agent display screen for window 310. In some embodiments, the amber emotion light may be displayed when the amber frequency threshold is exceeded but not when the amber frequency threshold is equaled. In some embodiments, a green emotion light and a yellow emotion light may be displayed adjacent to the amber emotion light on the agent display screen to show the light sequence (i.e., corresponding gradations of color) up to the highest frequency threshold that is met or exceeded. Similarly, in window 312, two of the calculated emotion scores (i.e., 23 and 19) are equal to or higher than the emotion score threshold value of 15, so the calculated frequency is 40% and an amber emotion light is displayed on the agent display screen for window 312.

In window 314, three of the five calculated emotion scores (i.e., 23, 19 and 15) are equal to or higher than the emotion score threshold value of 15. Therefore, the frequency at which scores in window 314 equal or exceed the emotion score threshold value of 15 is 3 out of 5, or 60%. In some embodiments, an emotion score may count in the frequency calculation if the score exceeds, but not if the score equals, the emotion score threshold value. Because the calculated frequency of 60% exceeds the yellow and amber frequency thresholds and equals the red frequency threshold, but is lower than the alert frequency threshold, a red emotion light is displayed on the agent display screen for window 314. In some embodiments, the red emotion light may be displayed when the red frequency threshold is exceeded but not when the red frequency threshold is equaled. In some embodiments, a green emotion light, a yellow emotion light, and an amber emotion light may be displayed adjacent to the red emotion light on the agent display screen to show the light sequence (i.e., corresponding gradations of color) up to the highest frequency threshold that is met or exceeded.

In window 316, four of the five calculated emotion scores (i.e., 23, 19, 15, and 21) are equal to or higher than the emotion score threshold value of 15. Therefore, the frequency at which scores in window 316 equal or exceed the emotion score threshold value of 15 is 4 out of 5, or 80%. In some embodiments, an emotion score may count in the frequency calculation if the score exceeds, but not if the score equals, the emotion score threshold value. Because the calculated frequency of 80% exceeds the yellow, amber, and red frequency thresholds and equals the alert frequency threshold, an emotion alert is displayed on the agent display screen for window 316. The emotion alert may be a visual or audible alert generated and sent by an alert processor, which may be hosted on one or more of servers 112, to an agent station 120. The alert processor may be multi-threaded and be invoked each time the emotion analysis engine calculates an emotion score.

In some embodiments, when the alert frequency threshold is equaled or exceeded, a visual or audible alert may be sent to a supervisor station 118, and the alert may be displayed on the supervisor display screen. In some embodiments, an alert may be displayed when the alert frequency threshold is exceeded but not when the alert frequency threshold is equaled. In some embodiments, a green emotion light, a yellow emotion light, an amber emotion light, and a red emotion light may be displayed on the agent display screen along with the alert to show the light sequence (i.e., corresponding gradations of color) up to the highest frequency threshold that is met or exceeded. In some embodiments, the equaling or exceeding of the alert frequency threshold may cause a preemptive action (e.g., a call to a supervisor/compliance officer, or an opportunity for a supervisor to listen in on the call, coach the agent, or barge in on the call) to be initiated. In some embodiments, the equaling or exceeding of the alert frequency threshold may result in the incrementing of an emotion event counter.

In window 318, three of the five calculated emotion scores (i.e., 19, 15, and 21) are equal to or higher than the emotion score threshold value of 15. Therefore, the frequency at which scores in window 318 equal or exceed the emotion score threshold value of 15 is 3 out of 5, or 60%. In some embodiments, an emotion score may count in the frequency calculation if the score exceeds, but not if the score equals, the emotion score threshold value. Because the calculated frequency of 60% exceeds the yellow and amber frequency thresholds and equals the red frequency threshold, but is lower than the alert frequency threshold, the alert generated for the previous window 316 disappears and a red emotion light is displayed on the agent display screen for window 318. In some embodiments, the red emotion light may be displayed when the red frequency threshold is exceeded but not when the red frequency threshold is equaled. In some embodiments, a green emotion light, a yellow emotion light, and an amber emotion light may be displayed adjacent to the red emotion light on the agent display screen to show the light sequence (i.e., corresponding gradations of color) up to the highest frequency threshold that is met or exceeded. Similar calculations are performed for windows 320, 322, and 324, whose deepest gradations of emotion light color are amber, red, and amber, respectively.

In some embodiments, the emotion light colors displayed on an agent display screen are also displayed on a supervisor display screen. In some embodiments, only the deepest gradation of emotion light color (i.e., the color corresponding to the highest frequency threshold that is met/exceeded) displayed on an agent display screen is also displayed on a supervisor display screen. It should be understood that agent display screens and supervisor display screens may simultaneously display emotion lights based on respective agent emotion scores and emotion lights based on respective customer emotion scores.

All customer emotion scores, agent emotion scores, frequencies at which a customer emotion score meets/exceeds the emotion score threshold, and frequencies at which an agent emotion score meets/exceeds the emotion score threshold calculated during a conversation between an agent and customer may be stored in a memory, for example on one or more of servers 112. Such stored data for a particular agent or a particular group of agents may be compiled into a call summary or report, which may include statistical analysis of the calculated values, and be used for training or evaluation purposes. In some embodiments, an emotion event may be generated, in real-time during a conversation, whenever the calculated frequency, at which calculated agent or customer emotion scores equal or exceed the emotion score threshold value, equals or exceeds one of the frequency thresholds. In some embodiments, an emotion event may be generated (e.g., by alert processor module 172) only when the calculated frequency equals or exceeds the red frequency threshold, or only when the calculated frequency equals or exceeds the alert frequency threshold. In some embodiments, all generated emotion events may be stored in a memory. The stored emotion events may be retrieved and used to generate call summaries or reports, as discussed further with respect to FIGS. 8 and 9.

FIGS. 4A-B and 5A-B relate to the configuring and setting up of a word/phrase detection engine (also referred to herein as "word/phrase analysis engine"). Word/Phrase detection is used to measure the technical correctness of a call by comparing, in real-time, the words spoken by an agent or customer to the words in a pre-determined dictionary. Using word/phrase detection in conjunction with the emotion analysis discussed above provides a very good means of establishing compliancy with laws affecting call center operations. For example, word/phrase detection may be used to determine whether a call center agent has read the "mini-Miranda" rights to a customer, notifying the customer that the call may be recorded.

Word/Phrase detection uses word/phrase base expressions in performing real-time analysis of an audio stream. A word/phrase base expression may have associated expression properties that may be used to determine call compliance and technical correctness. FIG. 4A is a table 400 of exemplary expression properties and expression property values of a word/phrase base expression. A word/phrase base expression, its expression properties, and its expression property values, such as the values shown in table 400, may be stored in a server 112 (e.g., analysis engine) of FIG. 1A and accessible by a supervisor/administrator. The expression properties and expression property values define when a word/phrase event should be generated during audio analysis. The expression evaluates to true (and a word/phrase event may be generated) when the analysis results from word/phrase detection engine module 158 satisfy the expression property values, which may be provided by profiles module 167 to alert processor module 172 of FIG. 1C. Table 400 includes fields for a word or phrase 402, an event type 404, an event count 406, a confidence threshold 408, a start time 410, a stop time 412, a score type 414, a score operator 416, and a score factor 418. It should be understood that the order of these fields is not necessarily of any particular significance, and that other fields may be included in table 400 instead of or in addition to the data described herein, as necessary or helpful to the effectiveness or robustness of a word/phrase base expression and word/phrase detection.

The expression property value in word/phrase field 402 designates a word or phrase to be detected. The word/phrase to be detected is sent, along with other expression property values, as one or more command strings to a word/phrase detection engine, which may be implemented on audio analyzer circuitry on one or more of servers 112. The word/phrase detection engine continuously analyzes an audio stream and determines whether specified words/phrases are spoken. The expression property value in event type field 404 designates whether the detection or non-detection of the word/phrase in field 402 should cause a word/phrase event to be generated. When the word/phrase event profile corresponding to table 400 is being evaluated, a word/phrase event may be generated in response to the detection of the word "hate" spoken during a conversation between an agent and a customer. In some embodiments, the expression property value in event type field 404 may designate the event type to be an occurrence (e.g., positive event, or PEV) or non-occurrence (e.g., negative event, or NEV). An occurrence means an event and/or alert will be generated based on the detected presence of words/phrases, while a non-occurrence means an event and/or alert will be generated based on the detected absence of words/phrases. In some embodiments, all generated word/phrase events may be stored in a memory. In some embodiments, each word/phrase event may be stored with a timestamp of when the word/phrase event was generated. The stored word/phrase events, timestamps, and other related information (e.g., calculated confidence level, score) may be retrieved and used to generate call summaries or reports, as discussed further with respect to FIGS. 8 and 9.

The expression property value in start time field 410 designates how long the word/phrase analysis engine should wait from the time of connection of a call before applying the word/phrase event profile (e.g., evaluating the word/phrase base expression). In table 400, the start time (also referred to herein as "offset time" or "duration offset") value is zero. Therefore, the word/phrase analysis engine will apply the corresponding word/phrase event profile as soon as the call connection occurs. If the start time value were, for example, 10 seconds, then the word/phrase event profile would not be applied until 10 seconds after the connection occurred.

The expression property value in stop time field 412 designates a time period, for example a number of seconds, after the start time during which the word/phrase event profile should be applied. In table 400, the stop time value is 30 seconds. Thus, after the word/phrase event profile is applied, the word/phrase detection engine will monitor the audio stream for occurrences of the word "hate" for 30 seconds. In some embodiments, the expression property value for stop time may be "no limit", in which case after the word/phrase event profile is applied, it will continue to be applied until the end of the conversation.

In some embodiments, expression properties of a word/phrase event profile may include elapsed time. The elapsed time value designates a time period, for example a number of seconds, that the word/phrase analysis engine should wait after the offset time before analyzing the audio stream. The elapsed time property (which may also be referred to as "duration elapsed") allows an elapsed timer to measure an elapsed time from the offset time after application of the word/phrase event profile begins. The delay in audio stream analysis allows for non-essential portions of a call (e.g., an agent greeting a customer, or the agent and customer making sure they can hear one another) to occur before analysis begins. For example, the elapsed time value may be 5 seconds. Thus, the word/phrase detection engine will begin its analysis of the audio stream 5 seconds after application of the word/phrase event profile begins. If the start time value of the word/phrase event profile were 10 seconds, the word/phrase detection engine would wait a total of 15 seconds after the call connection occurs before analyzing the audio stream (10 seconds of offset time, plus 5 seconds of elapsed time).

The expression property value in confidence threshold field 408 designates the minimum confidence level (i.e., probability) that must be calculated by the word/phrase detection engine in order for a word/phrase event to be generated (e.g., a word/phrase in the word/phrase base expression has been detected or not detected). A word/phrase detection with a calculated confidence level below this minimum is ignored. In some embodiments, the word/phrase detection engine may keep a count of how many times a word/phrase is detected (or not detected) during a call, and expression properties of a word/phrase event profile may include event count and count type. For example, table 400 may include event count and score type fields 406 and 414, respectively, which may have respective expression property values. The event count value designates the number of times a specified word/phrase must be detected (or not detected) before a word/phrase event or an alert is generated. The score type is used to indicate the direction of counting. Score type may be specified as positive (e.g., increase the count for each detected occurrence of a particular word/phrase) or negative (e.g., decrease the count for each detected non-occurrence of a particular word/phrase).

A detected (non-)occurrence of a word/phrase may increase (or decrease) the count by one, in accordance with a default or neutral scoring scheme. However, a user may enhance the scoring capabilities of the system by selecting another scoring scheme. For example, a user may select a scoring scheme according to which the count is increased (or decreased) by more than one (e.g., by a fixed number, by a multiple of the current count) whenever an occurrence of a specified word/phrase is detected (or not detected).

In some embodiments, expression properties for a word/phrase base expression may include score operator and score factor. For example, table 400 may include a score operator and score factor fields 416 and 418, respectively, which may have respective expression property values. At the end of the time that the word/phrase base expression is applied, the word/phrase detection engine may modify the event count by a number designated by the score factor value using an operation designated by the score operator value. In table 400, the score factor value is 5 and the score operator is MULT (i.e., multiplication). Thus, at the end of the time that the word/phrase base expression corresponding to table 400, the event count is multiplied by 5. In some embodiments, the score operator may be addition, subtraction, or division. In some embodiments, the score factor may be another integer, including a negative integer, or a non-integer.

FIG. 4B is another table 430 of exemplary expression properties and expression property values of a word/phrase base expression. Table 430 includes fields for a word or phrase 432, an event type 434, an event count 436, a confidence threshold 438, a start time 440, a stop time 442, a score type 444, a score operator 446, and a score factor 448. It should be understood that the order of these fields is not necessarily of any particular significance, and that other fields (e.g., elapsed time) may be included in table 430 instead of or in addition to the data described herein, as necessary or helpful to the effectiveness or robustness of a word/phrase base expression and word/phrase detection. When the word/phrase event profile corresponding to table 430 is being evaluated, a word/phrase event may be generated in response to the non-detection of the phrase "This call is being recorded" during a conversation between an agent and a customer.

FIG. 5A is a data structure 500 for storing expression property values of a word/phrase base expression. Data structure 500 may be stored in a database, for example on one or more of servers 112, and may include fields for a word or phrase 502, an event type 504, an event count 506, a confidence threshold 508, a start time 510, a stop time 512, a score type 514, a score operator 516, and a score factor 518. It should be understood that the order of these fields is not necessarily of any particular significance, and that other fields may be included in data structure 500 instead of or in addition to the data described herein, as necessary or helpful to the effectiveness or robustness of a word/phrase event profile and word/phrase analysis. As with table 400, when the word/phrase event profile corresponding to data structure 500 is being evaluated, a word/phrase event may be generated in response to the detection of the word "hate" spoken during a conversation between an agent and a customer.

FIG. 5B is another data structure 530 for storing expression property values of a word/phrase base expression. Data structure 530 may be stored in a database, for example on one or more servers 112, and may include fields for a word or phrase 532, an event type 534, an event count 536, a confidence threshold 538, a start time 540, a stop time 542, a score type 544, a score operator 546, and a score factor 548. It should be understood that the order of these fields is not necessarily of any particular significance, and that other fields may be included in data structure 530 instead of or in addition to the data described herein, as necessary or helpful to the effectiveness or robustness of a word/phrase event profile and word/phrase analysis. As with table 430, when the word/phrase event profile corresponding to data structure 530 is being evaluated, a word/phrase event may be generated in response to the non-detection of the phrase "This call is being recorded" during a conversation between an agent and a customer.

The word/phrase analysis engine performs a continuous analysis of the audio stream passed to it. The audio stream is from a conversation between an agent and a customer on a call channel. The word/phrase analysis engine may detect certain words/phrases spoken by the agent or customer and calculate a probability that a word/phrase was spoken. Based on the word/phrase detection and calculated probabilities, the word/phrase analysis engine may calculate a confidence level to determine whether to generate a word/phrase event. In some embodiments, the word/phrase analysis engine may send an alert to a supervisor station 118 when a specified word/phrase event, such as the absence of a reading of "mini-Miranda" rights, is generated during a conversation between an agent and a customer.

FIGS. 4C and 5C relate to the configuring and setting up of a targeted data detection engine. Data detection is used to incorporate internal and/or external data into call monitoring by identifying, in real-time, targeted data specified in data base expressions and/or composite expressions. Using data detection in conjunction with the emotion and word/phrase analysis discussed above provides a very good means of further establishing compliancy with laws affecting call center operations. For example, emotion detection may be used to determine the absence of anger and talkover, while word/phrase detection may be used to determine whether a call center agent has read the "mini-Miranda" rights to a customer to notify the customer that the call may be recorded, and data detection may be used in conjunction with these other detection methods to determine and provide warnings of applicable state restrictions.

A data base expression may have associated expression properties, which may be used to determine call compliance and technical correctness. FIG. 4C is a table 460 of exemplary expression properties and expression property values of a data base expression. A data base expression, its expression properties, and its expression property values, such as the values shown in table 460, may be stored in a server 112 (e.g., analysis engine) of FIG. 1A and accessible by a supervisor/administrator. The expression properties and expression property values define when a data event should be generated during audio analysis. The expression evaluates to true (and a data event may be generated) when the analysis results from targeted data detection engine 160 satisfy the expression property values, which may be provided by profiles module 167 to alert processor module 172 of FIG. 1C. Table 460 includes fields for targeted data 462 and a data dictionary name 464. It should be understood that the order of these fields is not necessarily of any particular significance, and that other fields may be included in table 460 instead of or in addition to the data described herein, as necessary or helpful to the effectiveness or robustness of a data base expression and data detection.

The expression property value in targeted data field 462 designates the data to be detected (i.e., the targeted data) during audio analysis. The data to be detected is transported, as either static or dynamic data, depending on the need for real-time or dynamic data in the expression, and on the method of data transport. Alert processor module 172 may continuously receive the data to be detected, or may periodically receive updates of the data to be detected, based on the prescribed data transport method(s) used. In table 460, the targeted data value is StatesRestrictions, which may refer to states that have restrictions on how and when calls may be recorded.

The expression property value in data dictionary name field 464 designates the data dictionary to be used when monitoring for the targeted data. In some embodiments, more than one data dictionary may be used. In table 460, the data dictionary name value is StatesDictionary, which may be a data dictionary of state names. When the data event profile corresponding to table 460 is being evaluated, a data event may be generated in response to a determination that a caller is located in a state whose name matches a state name in StatesDictionary. It should be understood that more than one type of targeted data may be monitored for, and multiple data dictionaries may be used, at the same time. In some embodiments, all generated data events may be stored in a memory. In some embodiments, each data event may be stored with a timestamp of when the data event was generated. The stored data events may be retrieved and used to generate call summaries or reports.

FIG. 5C is a data structure 560 for storing expression property values of a data base expression. Data structure 560 may be stored in a database, for example on one or more of servers 112, and may include fields for targeted data 562 and a data dictionary name 564. It should be understood that the order of these fields is not necessarily of any particular significance, and that other fields may be included in data structure 560 instead of or in addition to the data described herein, as necessary or helpful to the effectiveness or robustness of a data event profile and targeted data detection. As with table 460, when the data event profile corresponding to data structure 560 is being evaluated, a data event may be generated in response to a determination that a caller is located in a state whose name matches a state name in StatesDictionary.

FIGS. 6A-B depict an emotion level meter used to indicate agent and customer emotion levels based on emotion analysis. FIG. 6A depicts an emotion level meter 600 for indicating emotion levels of a call center agent and a customer. Meter 600 may include emotion lights 604, 606, 608, 610, 612, 614, and 616 which are lit based on emotion scores of an agent, as indicated by icon 602, and emotion lights 620, 622, 624, 626, 628, 630, and 632 which are lit based on emotion scores of a customer with whom the agent is speaking, as indicated by icon 618. When lit, emotion lights 604 and 620 may be green; emotion lights 606, 608, 622, and 624 may be yellow; emotion lights 610, 612, 626, and 628 may be amber; and emotion lights 614, 616, 630, and 632 may be red. It should be understood that any suitable gradation of colors for indicating emotion levels may be used in meter 600, and that the gradation may be more gradual than in the example just described (e.g., agent emotion lights 604, 606, 608, 610, 612, 614 may all be different colors when lit, and corresponding customer emotion lights 620, 622, 624, 626, 628, 630, and 632 may all be different colors when lit).

Meter 600 may be displayed on an agent's display screen (e.g., agent desktop at an agent station) during a conversation between the agent and a customer. The emotion lights of meter 600 may be lit based on the emotion scores and frequencies calculated by an emotion analysis engine, and in accordance with the expression property values of a specified emotion event profile, such as the emotion event profile corresponding to data structure 230 of FIG. 2B or the emotion event profile corresponding to data structure 260 of FIG. 2C. The determination of which emotion lights of meter 600 should be lit may be performed in real-time using an approach similar to the one illustrated in and discussed above with respect to FIG. 3. Thus, the display of lights on meter 600 may change in real-time in accordance with the most current calculated frequencies.

For example, for a window in which all of the calculated emotion scores for an agent (or a customer) are lower than the emotion score threshold value, the calculated frequency is 0% and green emotion light 604 (or green emotion light 620, if customer emotion scores are being calculated) is lit, while the rest of the emotion lights on the agent side of the meter (or the rest of the emotion lights on the customer side of the meter, if customer emotion scores are being calculated) are dark. For a window of calculated agent emotion scores that has a calculated frequency that equals or exceeds the yellow frequency threshold but is less than the amber frequency threshold, yellow emotion lights 606 and 608 (or yellow emotion lights 622 and 624, if the emotion scores are for a customer) may be lit, while the emotion lights to the right of the yellow emotion lights on the appropriate half of meter 600 remain dark. In some embodiments, yellow emotion light 608 may be lit only if the yellow frequency threshold is the highest frequency threshold that is met or exceeded by the calculated frequency for two or more consecutive windows. Analogous principles apply for the amber emotion lights and red emotion lights.

In some embodiments, all emotion lights to the left of the right-most lit emotion light on each side of meter 600 are also lit. In some embodiments, emotion lights that are lit on a particular side of meter 600 remain lit until the next emotion frequency is calculated and compared to the relevant frequency thresholds for that side. In some embodiments, meter 600 may reset to only green lights being lit in each half if no voice activity is detected on a call channel for more than a specified period of time, for example 10 seconds.

By having an emotion meter such as meter 600 displayed on an agent's display screen, the agent can see immediately what the customer's emotion levels are and know that heightened emotion levels, if continued, will activate a visible and/or audible alert to a supervisor, allowing the supervisor an opportunity to intervene. The agent may then attempt to lower the level of emotions in the conversation. In some embodiments, an alert may be sent to a supervisor if a red emotion light, or another non-green emotion light, of meter 600 is continuously lit over a time period longer than a predetermined threshold time (e.g., a red emotion light remains lit for longer than 10 seconds). Different emotion light colors may have different threshold times for when an alert is sent. The threshold time(s) may be specified in expression value properties of an emotion event profile, such as an emotion event profile corresponding to one of FIGS. 2A-C. A supervisor may be able to monitor a call's emotion levels from his or her display screen during the entire call. In some embodiments, only the emotion light corresponding to the highest frequency threshold that is met or exceeded by the calculated frequency for the most current window is displayed at the supervisor's display screen.

In some embodiments, a conversation between an agent and a customer may be monitored to determine if the agent states the "mini-Miranda" phrase within a certain time from the beginning of the call. Circuitry on one or more servers 112 may be conducting emotion analysis of the conversation and generating emotion level meter 650 of FIG. 6B, which is substantially similar to emotion meter 600 of FIG. 6A, for display on the agent's display screen. If the phrase is not detected within a certain timeframe, a word/phrase alert may be sent to a supervisor station, and the supervisor may send an instruction to the agent to read the "mini-Miranda" phrase to the customer. Such an instruction may appear along the top of meter 650 as an alert 652. If the call proceeds and the "mini-Miranda" phrase is still not detected, a visual and audible alert may be activated at a supervisor station 118 so that a supervisor can intervene. In some embodiments, alert 652 and similar alerts, messages, and instructions sent from a supervisor station 118 may appear as a scrolling marquee, and may disappear once the "mini-Miranda" phrase is detected.

FIGS. 7-9 depict various aspects of real-time and post-call analysis of calls between agents and customers. FIG. 7 shows a real-time report 700 with emotion and word/phrase information for the current calls of several call center agents. Real-time report 700 may be displayed on a display screen of a supervisor station 118 or compliancy management. Real-time report 700 includes several columns for displaying agent IDs 702, last names 704, first names 706, phone number extensions 708, callers or customers 710, agent emotion status 712, customer emotion status 714, number of agent emotion events 716, number of customer emotion events 718, number of agent word/phrase events 720, number of customer word/phrase events 722, and word/phrase detector alerts 724. Rows 726, 728, 730, 732, and 734 of real-time report 700 each correspond to a conversation between a call center agent and a respective customer. Data transport and/or integration methods used to generate real-time report 700 may be similar to methods used to populate the data table and structure of FIGS. 4C and 5C, respectively.

Agent emotion status column 712 and customer emotion status column 714 may include colored circles corresponding to the highest frequency threshold that is met or exceeded by the agent emotion frequency and customer emotion frequency, respectively, calculated in real-time for each conversation represented by a row in real-time report 700. The colors of the circles in columns 712 and 714 may change in real-time as agent and customer emotion levels change. For example, the color of a circle corresponding to a particular agent in column 712 may be the same color as the right-most emotion light (i.e., corresponding to the highest frequency threshold that is equaled or exceeded by the calculated frequency based on emotion scores) that is lit on the agent half of an emotion level meter, such as emotion level meter 600 of FIG. 6A, displayed on the agent's display screen. Similarly, the color of an adjacent circle in column 714 may be the same color as the right-most emotion light that is lit on the customer half of the emotion level meter displayed on the agent's display screen. Columns 716 and 718 of real-time report 700 show the number of times an agent emotion or customer emotion, respectively, is detected above a certain level. Columns 720 and 722 show the number of times an agent word/phrase event or customer word/phrase event, respectively, is generated. Word/phrase events may be defined by word/phrase event profiles, such as those corresponding to data structures 500 and 530.

In some embodiments, emotion alerts may be displayed in columns 712 and 714 when a calculated agent or customer emotion frequency is equal to or exceeds an alert frequency threshold. Column 724 of real-time report 700 may display word/phrase detector alerts, for example an alert that a certain agent has not yet read the "mini-Miranda" rights to the customer with whom the agent is currently speaking. When alerted, a supervisor can coach a particular agent by speaking only to the agent, "barge in" on the conversation between the agent and the customer (i.e., speak to both the agent and the customer), or merely monitor (i.e., listen in on) the conversation between the agent and the customer.

Real-time report 700 may include current conversation information for a subset of the call center agents who are assigned to a zone of a particular supervisor. Zone assignments may be based on geographical area, client portfolio, or any other suitable criteria. Agents may be added or removed from a zone by a supervisor or administrator with appropriate privileges.

FIG. 8 is a schematic summary 800 of a recorded agent-customer conversation with event tags. Event tags appear as different colored geometric symbols which differentiate event type and allow a system user, such as a supervisor, to quickly step through the audio at specific event occurrences. In FIG. 8, audio bar 802 represents the duration of a conversation between an agent and a customer. Time bar 804 marks the elapsed time during the conversation. A selection of a point along audio bar 802 may initiate playback of the conversation starting at the elapsed time indicated by time bar 804.

Schematic summary 800 includes agent portion 806 and customer portion 810, each of which includes representations of emotion scores for the agent and customer, respectively, during the course of the conversation as well as event tags marking when word/phrase events for the agent and customer, respectively, were generated during the conversation. Schematic summary 800 also includes talkover portion 808, which may indicate the frequency at which the agent and customer spoke at the same time during the course of the conversation. Talkover during the conversation may be detected by VAD module 154 and/or audio listening service 184.

The emotion scores represented in FIG. 8 are scores for the emotion of anger, and the score levels correspond to the heights of vertical bars. In some embodiments, the emotion scores represented in FIG. 8 may be calculated by emotion analysis engine module 156 and/or an instance of analysis service 186. Representations of emotion scores for other emotions, such as hesitation and uncertainty (which may correspond to other emotion event profiles created by and/or stored in, for example, expression builder module 170), may be displayed instead of or in addition to the anger emotion scores in schematic summary 800, and may appear as vertical bars having different colors or patterns.

Event tags representing word/phrase events (also referred to herein as "word/phrase event tags") appear in schematic summary 800 as inverted triangles. In some embodiments, event tags of colors may represent word/phrase events corresponding to different word/phrase event profiles. For example, event tags of a first color may represent the detection of a swear word, while event tags of a second color may represent the non-detection of the "mini-Miranda" rights. In some embodiments, word/phrase event tags corresponding to different word/phrase event profiles may have different geometric shapes. In some embodiments, the generation of various word/phrase events may be initiated by word/phrase detection engine module 158 and/or an instance of analysis service 186.

In some embodiments, schematic summary 800 may include event tags that represent emotion events (also referred to herein as "emotion event tags"). Emotion event tags may have different geometric shapes and/or colors than word/phrase event tags. In some embodiments, emotion event tags may have various colors that correspond to gradations of color representing various frequency thresholds, as discussed above with respect to FIG. 3. It should be understood that geometric shapes other than those illustrated in FIG. 8 may be used for event tags, and that various shades of color may be used for event tags to represent emotion events and/or word/phrase events corresponding to different event profiles. In some embodiments, a user may toggle on/off the display of different types of event tags and representations of some or all emotions determined during the call. This allows the user to identify other points of interest for the call (e.g., other emotions, other word/phrase events, promises made by the agent to the customer) that otherwise may have been missed.

Event tags, such as the event tags of FIG. 8, allow a user to step through the emotional signature of a call and quickly identify areas for replay of the audio. In some embodiments, when an event tag is selected, a segment of the recorded conversation starting from or surrounding (e.g., 5 seconds before and 5 seconds after) the event tag will be replayed.

Through the use of a built-in mini-digital voice recording system in combination with stored event tags, a supervisor at supervisor station 118 can replay the audio and display detailed scores for each emotional analysis, as well as obtain precise insight into causality for call compliance. A pre-built detailed drilldown process may allow easy identification of best and worst agent performers. By drilling down to the lowest level of detail, each call's events (emotion and word/phrase) can be reviewed, which may aid in agent training, counseling, and recognition.

FIG. 9 shows a report 900 that may be generated based on emotion and word/phrase information compiled over time for several agents. Report 900 includes several columns for displaying agent IDs 902, last names 904, and first names 906. Report 900 also includes several columns for displaying an agent's emotion score averages, including a column for an overall average 908, a column for an average over the last 10 days 910, and a column for an average over the last 30 days 912. In addition, report 900 includes several columns for displaying an agent's average number of word/phrase events per call, including a column for an overall average 914, a column for an average over the last 10 days 916, and a column for an average over the last 30 days 918. In some embodiments, report 900 may include columns for displaying an agent's average number of emotion events per call and average number of data events per call. Rows 920, 922, 924, 926, and 928 of report 900 each correspond to one of a plurality of call center agents, for example agents assigned to a particular zone, and row 930 may correspond to mean values of the specified averages across the call center.

Report 900 may be rendered in printed form or on a computer screen, such as a supervisor display screen. An interface may be provided for querying underlying data to generate reports covering different statistics, data sources, campaigns, time periods or ranges, and so forth. Thus, while an example report is provided for purposes of illustration, it should be understood that a wide range of reports are contemplated by this disclosure, and may be generated by the systems described herein. Reports like report 900 may be saved as favorite queries, moved into excel spreadsheets, and pulled into a business's data warehouse areas.

There are instances where emotion scores are false-positive; that is, a specific call has been identified with alerts/events, and replay of the call does not indicate or warrant these alerts/events. In these cases, an auditable method (using log files) may be used to replace these false-positive scores with agent population mean scores. The basis for using agent population mean scores is to ensure that for the call adjusted, there is minimal bias introduced.

Figure 10A:
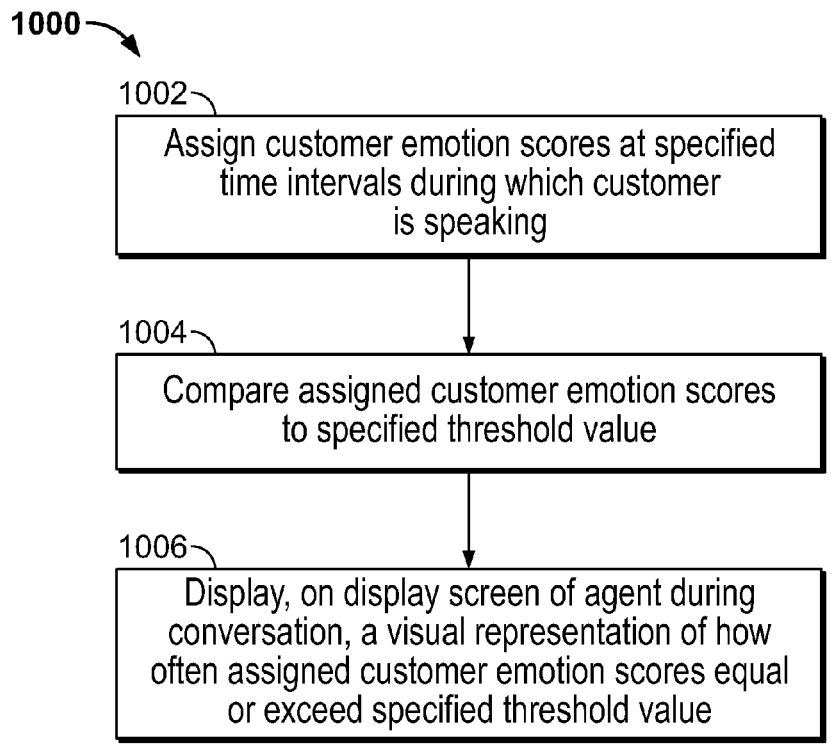
FIG. 10A is a flow chart of a process for displaying visual representations based on customer emotion levels according to an illustrative embodiment of the disclosure.

FIGS. 10A-12 depict processes associated with generating and displaying visual representations of call analysis performed at a call center. FIG. 10A is a flow chart of a process 1000 for displaying visual representations based on customer emotion levels. Process 1000 may begin with step 1002, at which customer emotion scores are assigned at specified time intervals during which the customer is speaking. At step 1004, the assigned customer emotion scores are compared to a specified threshold value. At step 1006, a visual representation of how often the assigned customer emotion scores equal or exceed the specified threshold value is displayed on the display screen of the agent during the conversation.

Figure 10B:
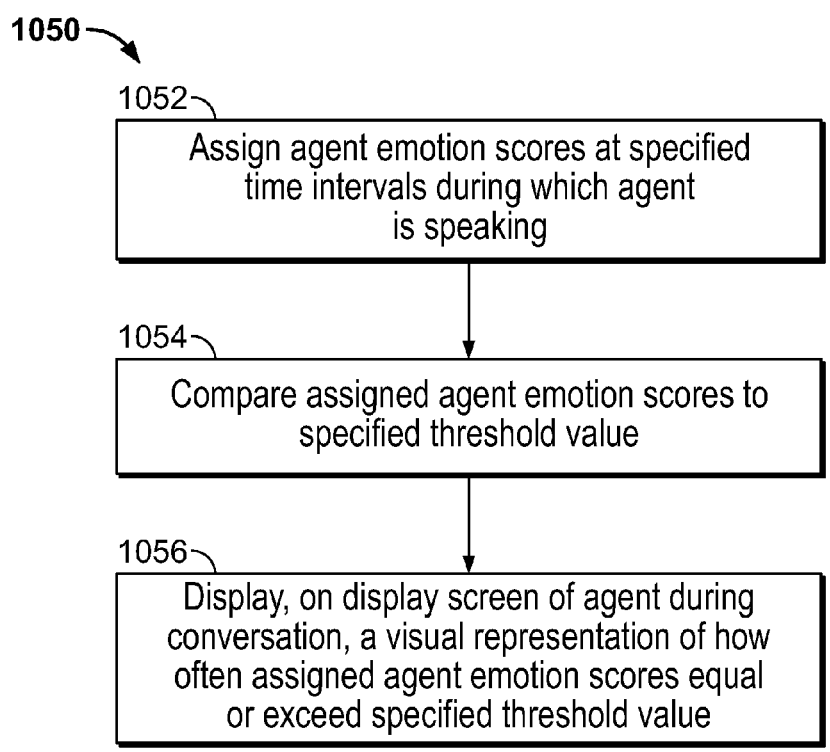
FIG. 10B is a flow chart of a process for displaying visual representations based on agent emotion levels according to an illustrative embodiment of the disclosure.

FIG. 10B is a flow chart of a process 1050 for displaying visual representations based on agent emotion levels. At step 1052, agent emotion scores are assigned at specified time intervals during which the agent is speaking. At step 1054, the assigned agent emotion scores are compared to the specified threshold value. At step 1056, a visual representation of how often the assigned agent emotion scores equal or exceed the specified threshold value is displayed on the display screen of the agent during the conversation.

Figure 11:
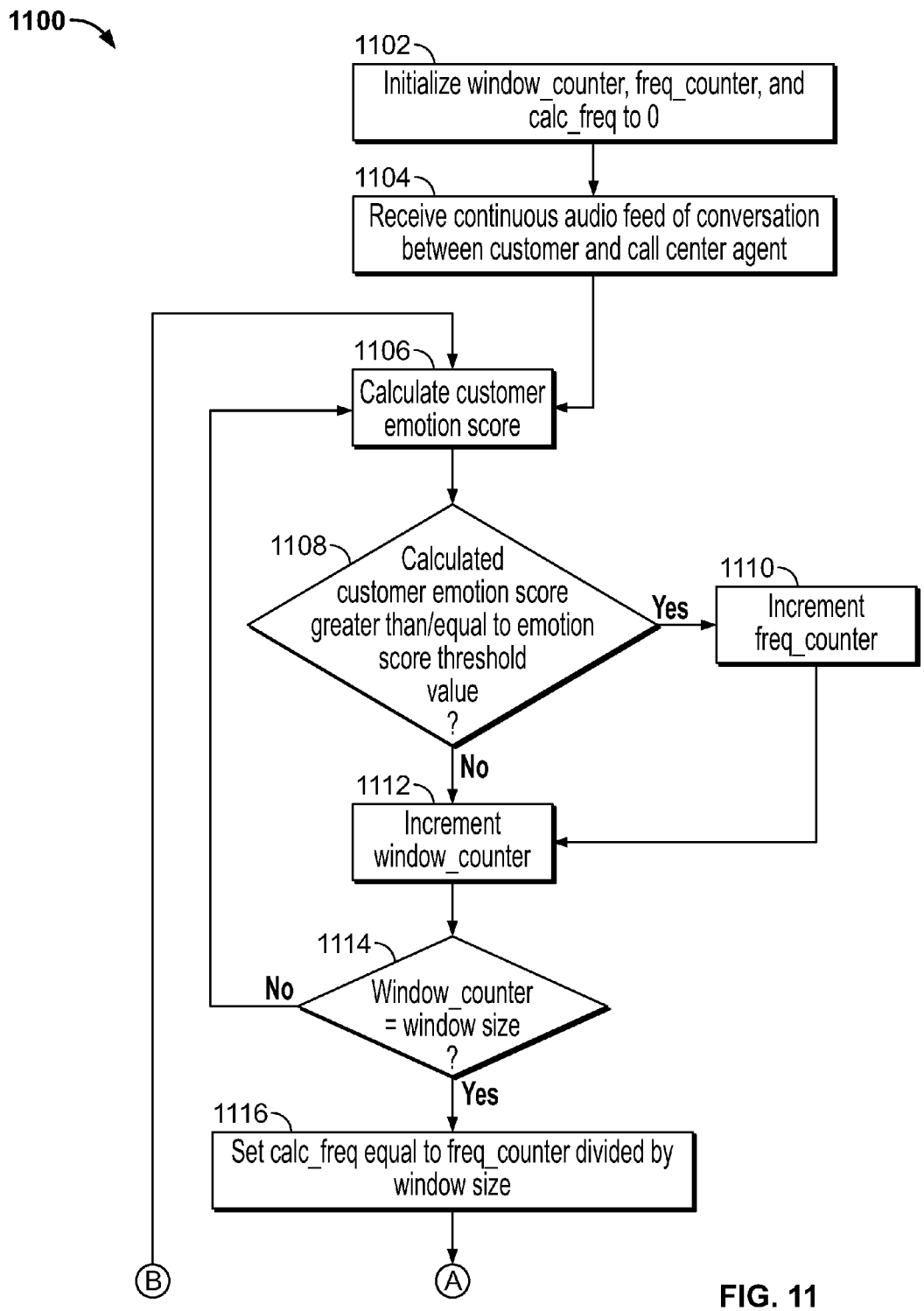
FIG. 11 is a flow chart of a process for determining emotion light colors according to an illustrative embodiment of the disclosure.
Figure 11:
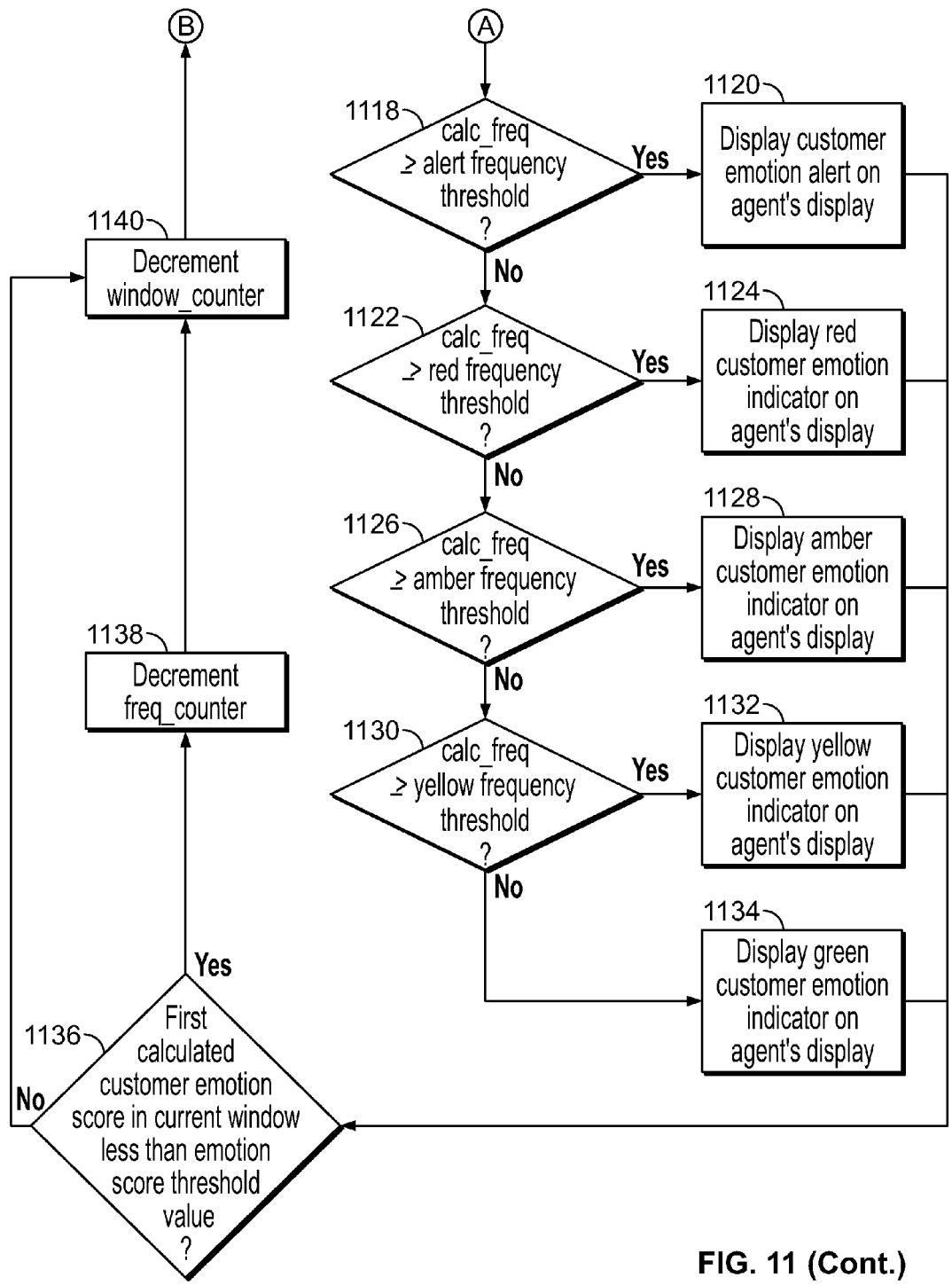

FIG. 11 is a flow chart of a process 1100 for determining emotion light colors. The illustrative process in FIG. 11 is directed to the display of customer emotion indicators at an agent's display screen, but is equally applicable to the display of agent emotion indicators at the agent's display screen. In some embodiments, process 1100 may be used to determine emotion light colors for the windows of FIG. 3. Process 1100 may begin with step 1102, at which a window counter (window_counter), frequency counter (freq_counter), and calculated frequency value holder (calc_freq) are initialized to zero. At step 1104, a continuous audio feed of a conversation between a customer and a call center agent is received. At step 1106, a customer emotion score is calculated. At step 1108, it is determined whether the calculated customer emotion score is greater than or equal to an emotion score threshold value. If the calculated customer emotion score is greater than or equal to the emotion score threshold value, the process proceeds to step 1110, at which freq_counter is incremented, before proceeding to step 1112. If the calculated customer emotion score is neither greater than nor equal to the emotion score threshold value (i.e., if the calculated customer emotion score is less than the emotion score threshold value), the process proceeds directly to step 1112.

At step 1112, window_counter is incremented. At step 1114, it is determined whether the value of window_counter is equal to a specified window size. If the value of window_counter is not equal to the specified window size, the process loops back to step 1106. If the value of window_counter is equal to the specified window size, the process proceeds to step 1116.

At step 1116, calc_freq is set equal to the value of freq_counter divided by the window size. At step 1118, it is determined whether calc_freq is greater than or equal to a specified alert frequency threshold. If calc_freq is greater than or equal to the specified alert frequency threshold, the process proceeds to step 1120, at which a customer emotion alert is displayed on the agent's display screen, before proceeding to step 1136.

If calc_freq is neither greater than nor equal to the specified alert frequency threshold (i.e., if calc_freq is less than the specified alert frequency threshold), the process proceeds to step 1122. At step 1122, it is determined whether calc_freq is greater than or equal to a specified red frequency threshold. If calc_freq is greater than or equal to the specified red frequency threshold, the process proceeds to step 1124, at which a red customer emotion indicator is displayed on the agent's display screen, before proceeding to step 1136.

If calc_freq is neither greater than nor equal to the specified red frequency threshold (i.e., if calc_freq is less than the specified red frequency threshold), the process proceeds to step 1126. At step 1126, it is determined whether calc_freq is greater than or equal to a specified amber frequency threshold. If calc_freq is greater than or equal to the specified amber frequency threshold, the process proceeds to step 1128, at which an amber customer emotion indicator is displayed on the agent's display screen, before proceeding to step 1136.

If calc_freq is neither greater than nor equal to the specified amber frequency threshold (i.e., if calc_freq is less than the specified amber frequency threshold), the process proceeds to step 1130. At step 1130, it is determined whether calc_freq is greater than or equal to a specified yellow frequency threshold. If calc_freq is greater than or equal to the specified yellow frequency threshold, the process proceeds to step 1132, at which a yellow customer emotion indicator is displayed on the agent's display screen, before proceeding to step 1136.

If calc_freq is neither greater than nor equal to the specified yellow frequency threshold (i.e., if calc_freq is less than the specified yellow frequency threshold), the process proceeds to step 1134, at which a green customer emotion indicator is displayed on the agent's display screen, before proceeding to step 1136.

At step 1136, it is determined whether the first calculated customer emotion score in the current window is less than the emotion score threshold value. If the first calculated customer emotion score in the current window is less than the emotion score threshold value, the process proceeds to step 1138, at which freq_counter is decremented, before proceeding to step 1140. If the first calculated customer emotion score in the current window is not less than the emotion score threshold value (i.e., if the first calculated customer emotion score in the current window is greater than or equal to the emotion score threshold value), the process proceeds directly to step 1140. From step 1140, at which window_counter is decremented, the process loops back to step 1106.

Figure 12:
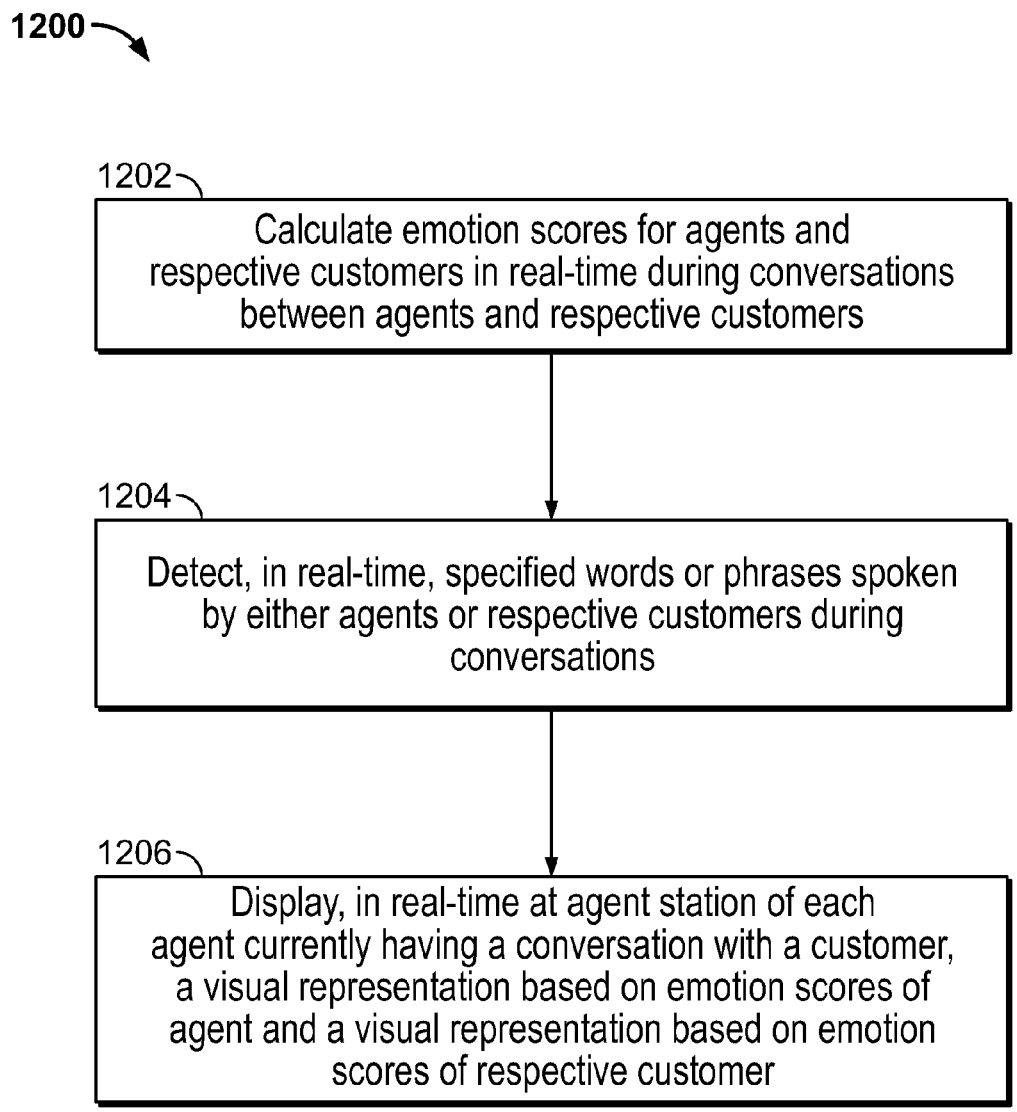
FIG. 12 is a flow chart of a process for combining emotion detection and word/phrase detection at a call center according to an illustrative embodiment of the disclosure.

FIG. 12 is a flow chart of a process 1200 for combining emotion detection and word/phrase detection at a call center. Process 1200 may begin at step 1202, at which emotion scores are calculated for agents and respective customers in real-time during conversations between the agents and respective customers. At step 1204, specified words or phrases spoken by either the agents or the respective customers during the conversations are detected in real-time. At step 1206, a visual representation based on emotion scores of an agent and a visual representation based on emotion scores of a respective customer are displayed in real-time at an agent station of each agent currently having a conversation with a customer.

It should be understood that processes described herein including, among others, processes 1000, 1050, 1100, and 1200, as well as the modules of block diagram 150 and call center 114 generally, may be realized in hardware, software, or some combination of these, provided connections are included for the agent and supervisor stations. In particular, processes described herein including, among others, processes 1000, 1050, 1100, and 1200 may be carried out by software, firmware, or microcode operating on a computer or computers of any type, including preexisting or already-installed telephony, video, voice-over-IP, or other processing facilities capable of supporting any or all of a server's functions. Processes described herein including, among others, processes 1000, 1050, 1100, and 1200, as well as functions of the modules of block diagram 150, may be realized in one or more microprocessors, microcontrollers, embedded microcontrollers, programmable digital signal processors or other programmable device, along with internal and/or external memory such as read-only memory, programmable read-only memory, electronically erasable programmable read-only memory, random access memory, dynamic random access memory, double data rate random access memory, Rambus direct random access memory, flash memory, or any other volatile or non-volatile memory or non-transitory computer-readable medium (e.g., magnetic media, punched tape or card, compact disc (CD) in any form, DVD, etc.) for storing program instructions (e.g., source code, object code, interpreted code, etc.), program data, and program output or other intermediate or final results. Accordingly, the systems and methods described herein are not limited to any particular platform, unless specifically stated otherwise in the present disclosure.

Any combination of the above circuits and components, whether packaged discretely, as a chip, as a chipset, or as a die, may be suitably adapted to use with the systems described herein. It should further be understood that the above processes described herein including, among others, processes 1000, 1050, 1100, and 1200, as well as call center 114 and the modules of block diagram 150, may be realized as computer executable code created using a structured programming language such as C, an object oriented programming language such as C++, or any other high-level or low-level programming language that may be compiled or interpreted to run on one of the above devices, as well as heterogeneous combinations of processors, processor architectures, or combinations of different hardware and software. Finally, while processes described herein including, among others, processes 1000, 1050, 1100, and 1200 are depicted as a single flow of steps, it should be understood that any number of similar or identical processes may be executed in parallel, according to the call volume of the call center and the capabilities of the computer(s) that manage operation of the call center.

It should be understood that many steps of processes described herein including, among others, processes 1000, 1050, 1100, and/or 1200 may be implemented using a number of different hardware and software designs, such as interrupt-driven state machines or program loops. In addition, the order of some of the steps is arbitrary. All such embodiments are intended to fall within the scope of this disclosure.

Generally, the processes described herein including, among others, processes 1000, 1050, 1100, and 1200 may be executed on a conventional data processing platform such as an IBM PC-compatible computer running the Windows operating systems, a SUN workstation running a UNIX operating system, or another equivalent personal computer or workstation. Alternatively, the data processing system may comprise a dedicated processing system that includes an embedded programmable data processing unit.

The processes described herein including, among others, processes 1000, 1050, 1100, and 1200 and processes performed by the modules of block diagram 150, may also be realized as a software component operating on a conventional data processing system such as a UNIX workstation or server. The processes may be implemented as a computer program written in any of several languages well-known to those of ordinary skill in the art, such as (but not limited to) C, C++, FORTRAN, Java, SQL, or BASIC. The processes may also be executed on commonly available clusters of processors, such as Western Scientific Linux clusters, which are able to allow parallel execution of all or some of the steps in a process.

The methods and systems described herein may be embodied in other specific forms without departing from the spirit or essential characteristics thereof. The forgoing embodiments are therefore to be considered in all respects illustrative, rather than limiting of the disclosure.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for analyzing conversations between customers and call center agents in real-time, the system comprising processing circuitry configured to:
   receive a first plurality of user inputs for creating a plurality of base expressions and composite expressions, wherein the plurality of base expressions and composite expressions are included in an expression list;
   receive a second plurality of user inputs for creating an abstract profile, wherein the second plurality of user inputs comprises selections from the expression list of some of the plurality of base expressions and composite expressions for inclusion in the abstract profile;
   generate a new profile based on the abstract profile, wherein the new profile includes the selected expressions;
   evaluate, while the new profile is active, the selected expressions in real-time during conversations between customers and call center agents; and
   generate, for display at an agent station, a first visual representation based on evaluation of the selected expressions.

2. The system of claim 1, wherein the selected expressions include at least one of an emotion base expression, a word/phrase base expression, and a data base expression.

3. The system of claim 2, wherein evaluation of the selected expressions comprises at least one of:
- a comparison of an emotion score, corresponding to the emotion base expression, to a user-defined threshold value,
    - a comparison of a detected word or phrase, corresponding to the word/phrase base expression, to a user-defined keyword list, and
    - a comparison of a data variable, corresponding to the data base expression, to a user-defined data value.

4. The system of claim 3, wherein the first visual representation is a visual representation of one or more results of one or more of the comparisons.

5. The system of claim 4, wherein the emotion score is one of a plurality of emotion scores, corresponding to the emotion base expression, calculated during a specified time interval, and wherein the first visual representation comprises a color corresponding to how many of the plurality of emotion scores exceed the threshold value.

6. The system of claim 1, wherein the processing circuitry is further configured to receive assignments of expression properties and expression property values to at least some of the plurality of base expressions and composite expressions.

7. The system of claim 1, wherein the processing circuitry is further configured to perform an action when one of the selected expressions evaluates to true while the new profile is active, and wherein the action is one of sending a message to the agent station, sending a message to a supervisor station, generating a phone call to a designated party, managing system controls, calling an application programming interface, calling a web service, and executing a read or write command to a database.

8. The system of claim 1, wherein:
- the processing circuitry is further configured to receive a third plurality of user inputs for assigning profile properties to the abstract profile;
- the profile properties comprise at least one of nesting, scoring, timers, exceptions, and actions; and
- the new profile is a custom profile generated based on the third plurality of user inputs and the abstract profile.

9. The system of claim 1, wherein the processing circuitry is further configured to display a second visual representation based on the evaluation of the selected expressions.

10. The system of claim 1, wherein the processing circuitry is further configured to:
- receive a user input for changing the abstract profile; and
- in response to the user input for changing the abstract profile, change the new profile based on changes to the abstract profile without further user input.

11. The system of claim 10, wherein the processing circuitry is further configured to:
- generate a second new profile based on the abstract profile, wherein the second new profile includes the selected expressions; and
- in response to the user input for changing the abstract profile, change the second new profile based on changes to the abstract profile without further user input.

12. The system of claim 1, wherein the new profile is different from the abstract profile.

* * * * *